United States Patent
Wang et al.

(10) Patent No.: US 12,390,931 B2
(45) Date of Patent: Aug. 19, 2025

(54) AUTONOMOUS ROBOT PACKAGING OF ARBITRARY OBJECTS

(71) Applicant: The Board of Trustees of the University of Illinois, Urbana, IL (US)

(72) Inventors: Fan Wang, Woburn, MA (US); Kristoffer Karl Hauser, Champaign, IL (US)

(73) Assignees: Duke University, Durham, NC (US); The Board of Trustees of the University of Illinois, Urbana, IL (US)

( * ) Notice: Subject to any disclaimer, the term of this patent is extended or adjusted under 35 U.S.C. 154(b) by 463 days.

(21) Appl. No.: 17/377,232

(22) Filed: Jul. 15, 2021

(65) Prior Publication Data
US 2022/0016779 A1  Jan. 20, 2022

Related U.S. Application Data

(60) Provisional application No. 63/051,956, filed on Jul. 15, 2020.

(51) Int. Cl.
*B25J 9/16* (2006.01)
*B25J 13/08* (2006.01)
(Continued)

(52) U.S. Cl.
CPC .............. *B25J 9/1669* (2013.01); *B25J 9/163* (2013.01); *B25J 9/1633* (2013.01); *B25J 13/085* (2013.01);
(Continued)

(58) Field of Classification Search
CPC ........ B25J 9/1669; B25J 9/163; B25J 9/1633; B25J 13/085; B25J 9/1697; G06N 3/08;
(Continued)

(56) References Cited

U.S. PATENT DOCUMENTS 9,102,055 B1 * 8/2015 Konolige ............... B25J 9/1612
9,898,833 B1 * 2/2018 Jankevics ................ G06T 7/62
(Continued)

FOREIGN PATENT DOCUMENTS

EP  3103596 A1 * 12/2016
GB  2602358 A  *  6/2022  .............. B25J 9/163

OTHER PUBLICATIONS

EP-3103596-A1 translation (Year: 2016).*
(Continued)

*Primary Examiner* — Kyle T Johnson
(74) *Attorney, Agent, or Firm* — McDonnell Boehnen Hulbert & Berghoff LLP

(57) ABSTRACT

Embodiments described herein relate to a system for packing objects in a container. The system may include a robotic device with a robotic arm, a plurality of object detection sensors, and a controller including at least one processor and a non-transitory computer-readable medium. The non-transitory computer-readable medium may store a set of program instructions, and the at least one processor may execute the program instructions including the operations of sensing a measurement of each object among a plurality of objects with at least one object detection sensor of the plurality of object detection sensors, obtaining a three-dimensional model for each object, determining a packing plan for the plurality of objects based on the three-dimensional model for each object, and loading, by a robotic arm, at least a portion of the plurality of objects into a container according to the packing plan for the plurality of objects.

19 Claims, 7 Drawing Sheets

(51) Int. Cl.
  *G06N 3/08* (2023.01)
  *G06T 7/11* (2017.01)
  *G06T 7/50* (2017.01)
  *G06T 7/73* (2017.01)
  *G06T 17/20* (2006.01)

(52) U.S. Cl.
  CPC ............... *G06N 3/08* (2013.01); *G06T 7/11* (2017.01); *G06T 7/50* (2017.01); *G06T 7/75* (2017.01); *G06T 17/20* (2013.01); *G06T 2207/10024* (2013.01); *G06T 2207/10028* (2013.01)

(58) Field of Classification Search
  CPC .. G06N 3/045; G06T 7/11; G06T 7/50; G06T 7/75; G06T 17/20; G06T 2207/10024; G06T 2207/10028; G05B 2219/40067
  See application file for complete search history.

(56) References Cited

U.S. PATENT DOCUMENTS

| | | | | |
|---|---|---|---|---|
| 10,699,421 | B1* | 6/2020 | Cherevatsky | G06V 20/52 |
| 10,776,661 | B2* | 9/2020 | Gu | G06T 7/97 |
| 11,625,854 | B2* | 4/2023 | Guo | B66F 9/0755 |
| | | | | 382/103 |
| 2004/0027358 | A1* | 2/2004 | Nakao | G06T 11/40 |
| | | | | 345/422 |
| 2005/0146521 | A1* | 7/2005 | Kaye | H04N 13/122 |
| | | | | 345/419 |
| 2015/0003678 | A1* | 1/2015 | Watanabe | B25J 9/1697 |
| | | | | 382/103 |
| 2015/0009214 | A1* | 1/2015 | Lee | G06T 17/10 |
| | | | | 345/420 |
| 2016/0167232 | A1* | 6/2016 | Takeshita | G06V 20/20 |
| | | | | 901/14 |
| 2016/0171705 | A1* | 6/2016 | Bendall | G06T 19/00 |
| | | | | 382/103 |
| 2018/0092304 | A1* | 4/2018 | Moore | B25J 9/0084 |
| 2018/0250820 | A1* | 9/2018 | Shimodaira | B25J 9/1697 |
| 2019/0138381 | A1* | 5/2019 | Akella | G06V 40/20 |
| 2019/0210223 | A1* | 7/2019 | Goldberg | G06T 17/20 |
| 2019/0251210 | A1* | 8/2019 | Pivac | B25J 9/1694 |
| 2019/0291277 | A1* | 9/2019 | Oleynik | B25J 9/1669 |
| 2020/0078941 | A1* | 3/2020 | Oka | B25J 9/1653 |
| 2020/0269429 | A1* | 8/2020 | Chavez | B25J 15/0052 |
| 2020/0311956 | A1* | 10/2020 | Choi | G06V 10/454 |
| 2020/0361083 | A1* | 11/2020 | Mousavian | B25J 9/1612 |
| 2021/0129334 | A1* | 5/2021 | Kanunikov | B25J 9/1671 |
| 2021/0178593 | A1* | 6/2021 | Ye | G06F 18/2413 |
| 2021/0179356 | A1* | 6/2021 | Chen | G06T 7/70 |
| 2022/0016779 | A1* | 1/2022 | Wang | G06T 7/50 |
| 2023/0035883 | A1* | 2/2023 | Katsura | G06T 7/62 |
| 2023/0150137 | A1* | 5/2023 | Sun | B25J 9/0084 |
| | | | | 700/248 |

OTHER PUBLICATIONS

Acquisition_of_a_dense_3D_model_database_for_robotic_vision (Year: 2009).*

Rusu, Radu Bogdan, and Steve Cousins. "3d is here: Point cloud library (pcl)." In 2011 IEEE international conference on robotics and automation, pp. 1-4. IEEE, 2011.

Zhang, Defu, and Wenqi Huang. "A simulated annealing algorithm for the circles packing problem." In International Conference on Computational Science, pp. 206-214. Springer, Berlin, Heidelberg, 2004.

Yu, Kuan-Ting, Nima Fazeli, Nikhil Chavan-Dafle, Orion Taylor, Elliott Donlon, Guillermo Diaz Lankenau, and Alberto Rodriguez. "A summary of team mit's approach to the amazon picking challenge 2015." arXiv preprint arXiv:1604.03639 (2016).

Viegas, Joaquim L., Susana M. Vieira, Elsa MP Henriques, and Joao MC Sousa. "A tabu search algorithm for the 3D pin packing problem in the steel industry." In CONTROLO'2014—Proceedings of the 11th Portuguese Conference on Automatic Control, pp. 355-364. Springer, Cham, 2015.

Or, Yizhar, and Elon Rimon. "Computation and Graphical Characterization of Robust Multiple-Contact Postures in 2D Gravitational Environments." In Proceedings of the 2005 IEEE International Conference on Robotics and Automation, 22 pp. IEEE, 2005.

Diamond, Steven, and Stephen Boyd. "CVXPY: A Python-embedded modeling language for convex optimization." The Journal of Machine Learning Research 17, No. 1 (2016): 2909-2913.

He, Kaiming, Xiangyu Zhang, Shaoqing Ren, and Jian Sun. "Deep residual learning for image recognition." In Proceedings of the IEEE conference on computer vision and pattern recognition, pp. 770-778. 2016.

Wang, Chen, Danfei Xu, Yuke Zhu, Roberto Martin-Martin, Cewu Lu, Li Fei-Fei, and Silvio Savarese. "Densefusion: 6d object pose estimation by iterative dense fusion." In Proceedings of the IEEE/CVF conference on computer vision and pattern recognition, pp. 3343-3352. 2019.

Rusinkiewicz, Szymon, and Marc Levoy. "Efficient variants of the ICP algorithm." In Proceedings third international conference on 3-D digital imaging and modeling, pp. 145-152. IEEE, 2001.

Den Boef, Edgar, Jan Korst, Silvano Martello, David Pisinger, and Daniele Vigo. "Erratum to "the three-dimensional bin backing problem": robot-packable and orthogonal variants of packing problems." Operations Research 53, No. 4 (2005): 735-736.

Crainic, Teodor Gabriel, Guido Perboli, and Roberto Tadei. "Extreme point-based heuristics for three-dimensional bin packing." Informs Journal on computing 20, No. 3 (2008): 368-384.

Egeblad, Jens, Benny K. Nielsen, and Allan Odgaard. "Fast neighborhood search for two-and three-dimensional nesting problems." European Journal of Operational Research 183, No. 3 (2007): 1249-1266.

Schwarz, Max, Christian Lenz, German Martin Garcia, Seongyong Koo, Arul Selvam Periyasamy, Michael Schreiber, and Sven Behnke. "Fast object learning and dual-arm coordination for cluttered stowing, picking, and packing." In 2018 EEE International Conference on Robotics and Automation (ICRA), pp. 3347-3354. IEEE, 2018.

Faroe, Oluf, David Pisinger, and Martin Zachariasen. "Guided local search for the three-dimensional bin-packing problem." Informs journal on computing 15, No. 3 (2003): 267-283.

Zhou, Qian-Yi, Jaesik Park, and Vladlen Koltun. "Open3D: A modern library for 3D data processing." arXiv preprint arXiv:1801.09847 (2018).

Baker, Brenda S., Edward G. Coffman, Jr, and Ronald L. Rivest. "Orthogonal packings in two dimensions." SIAM Journal on computing 9, No. 4 (1980): 846-855.

Goldberg, Ken, Brian V. Mirtich, Yan Zhuang, John Craig, Brian R. Carlisle, and John Canny. "Part pose statistics: Estimators and experiments." IEEE Transactions on Robotics and Automation 15, No. 5 (1999): 17 pp.

Kazhdan, Michael, Matthew Bolitho, and Hugues Hoppe. "Poisson surface reconstruction." In Proceedings of the fourth Eurographics symposium on Geometry processing, vol. 7. 2006.

Xiang, Yu, Tanner Schmidt, Venkatraman Narayanan, and Dieter Fox. "Posecnn: A convolutional neural network for 6d object pose estimation in cluttered scenes." arXiv preprint arXiv:1711.00199 (2017).

Paszke, Adam, Sam Gross, Francisco Massa, Adam Lerer, James Bradbury, Gregory Chanan, Trevor Killeen et al. "Pytorch: An imperative style, high-performance deep learning library." Advances in neural information processing systems 32 (2019): 8026-8037.

Yu, Kuan-Ting, and Alberto Rodriguez. "Realtime state estimation with tactile and visual sensing for inserting a suction-held object." In 2018 IEEE/RSJ International Conference on Intelligent Robots and Systems (IROS), pp. 1628-1635. IEEE, 2018.

Zeng, Andy, Shuran Song, Kuan-Ting Yu, Elliott Donlon, Francois R. Hogan, Maria Bauza, Daolin Ma et al. "Robotic pick-and-place of novel objects in clutter with multi-affordance grasping and

(56) References Cited

OTHER PUBLICATIONS cross-domain image matching." In 2018 IEEE international conference on robotics and automation (ICRA), pp. 3750-3757. IEEE, 2018.
Adams, Rolf, and Leanne Bischof. "Seeded region growing." IEEE Transactions on pattern analysis and machine intelligence 16, No. 6 (1994): 641-647.
Wang, Fan, and Kris Hauser. "Stable bin packing of non-convex 3D objects with a robot manipulator." In 2019 International Conference on Robotics and Automation (ICRA), 9 pp. IEEE, 2019.
Dong, Siyuan, and Alberto Rodriguez. "Tactile-based insertion for dense box-packing." In 2019 IEEE/RSJ International Conference on Intelligent Robots and Systems (IROS), pp. 7953-7960. IEEE, 2019.
Martello, Silvano, David Pisinger, and Daniele Vigo. "The three-dimensional bin packing problem." Operations research 48, No. 2 (2000): 25 pp.
Shome, Rahul, Wei N. Tang, Changkyu Song, Chaitanya Mitash, Hristiyan Kourtev, Jingjin Yu, Abdeslam Boularias, and Kostas E. Bekris. "Towards robust product packing with a minimalistic end-effector." In 2019 International Conference on Robotics and Automation (ICRA), pp. 9007-9013. IEEE, 2019.
Wang, Fan, and Kris Hauser. "Stable bin packing of non-convex 3D objects with a robot manipulator." In 2019 International Conference on Robotics and Automation (ICRA), pp. 8698-8704. IEEE, 2019.
Lodi, Andrea, Silvano Martello, and Daniele Vigo. "TSpack: a unified tabu search code for multi-dimensional bin backing problems." Annals of Operations Research 131, No. 1 (2004): 203-213.
Wang, Lei, Songshan Guo, Shi Chen, Wenbin Zhu, and Andrew Lim. "Two natural heuristics for 3D packing with practical loading constraints." In Pacific Rim International Conference on Artificial Intelligence, pp. 256-267. Springer, Berlin, Heidelberg, 2010.
Johnson, David S., Alan Demers, Jeffrey D. Ullman, Michael R. Garey, and Ronald L. Graham. "Worst-case performance bounds for simple one-dimensional packing algorithms." SIAM Journal on computing 3, No. 4 (1974): 299-325.
Calli, Berk, Arjun Singh, James Bruce, Aaron Walsman, Kurt Konolige, Siddhartha Srinivasa, Pieter Abbeel, and Aaron M. Dollar. "Yale-CMU-Berkeley dataset for robotic manipulation research." The International Journal of Robotics Research 36, No. 3 (2017): 261-268.
E. Coumans and Y. Bai, "Pybullet, a python module for physics simulation for games, robotics and machine learning," http://pybullet.org, 2016-2019.
Martello, Silvano, and Daniele Vigo. "Exact solution of the two-dimensional finite bin packing problem." Management science 44, No. 3 (1998): 388-399.
Garey, Michael R., and David S. Johnson. Computers and intractability. vol. 174. San Francisco: freeman, 1979.
Liu, Xiao, Jia-min Liu, and An-xi Cao. "HAPE3D-a new constructive algorithm for the 3D irregular packing problem." Frontiers of Information Technology & Electronic Engineering 16, No. 5 (2015): 380-390.
Kämpke, Thomas. "Simulated annealing: use of a new tool in bin packing." Annals of Operations Research 16, No. 1 (1988): 327-332.
Egeblad, Jens. "Heuristics for multidimensional packing problems." Københavns UniversitetKøbenhavns Universitet, Det Naturvidenskabelige FakultetFaculty of Science, Datalogisk InstitutDepartment of Computer Science (2008). (Split into two PDFs).
Bennell, Julia A., Lai Soon Lee, and Chris N. Potts. "A genetic algorithm for two-dimensional bin packing with due dates." International Journal of Production Economics 145, No. 2 (2013): 547-560.
Lodi, Andrea, Silvano Martello, and Daniele Vigo. "Heuristic algorithms for the three-dimensional bin packing problem." European Journal of Operational Research 141, No. 2 (2002): 410-420.
Rennie, Colin, Rahul Shome, Kostas E. Bekris, and Alberto F. De Souza. "A dataset for improved rgbd-based object detection and pose estimation for warehouse pick-and-place." IEEE Robotics and Automation Letters 1, No. 2 (2016): 1179-1185.

\* cited by examiner

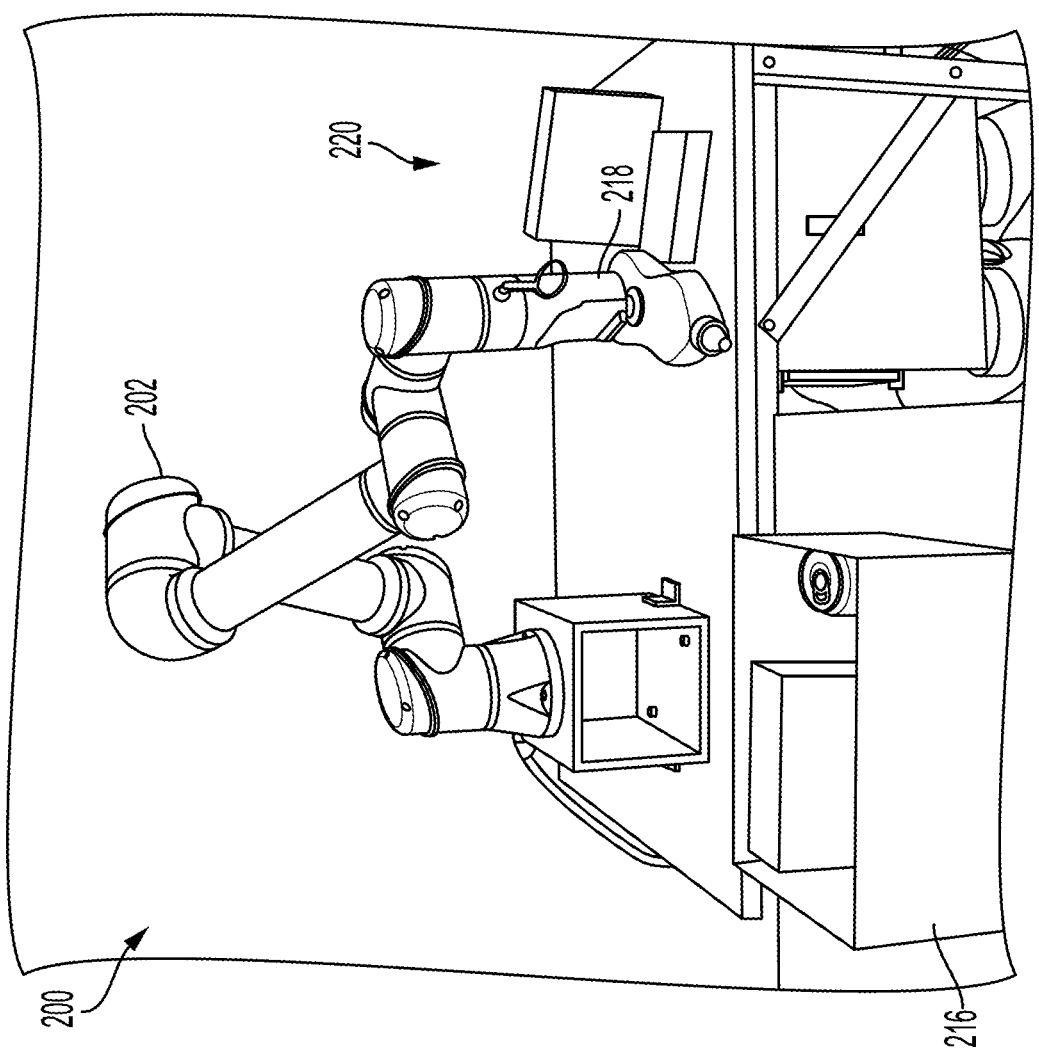

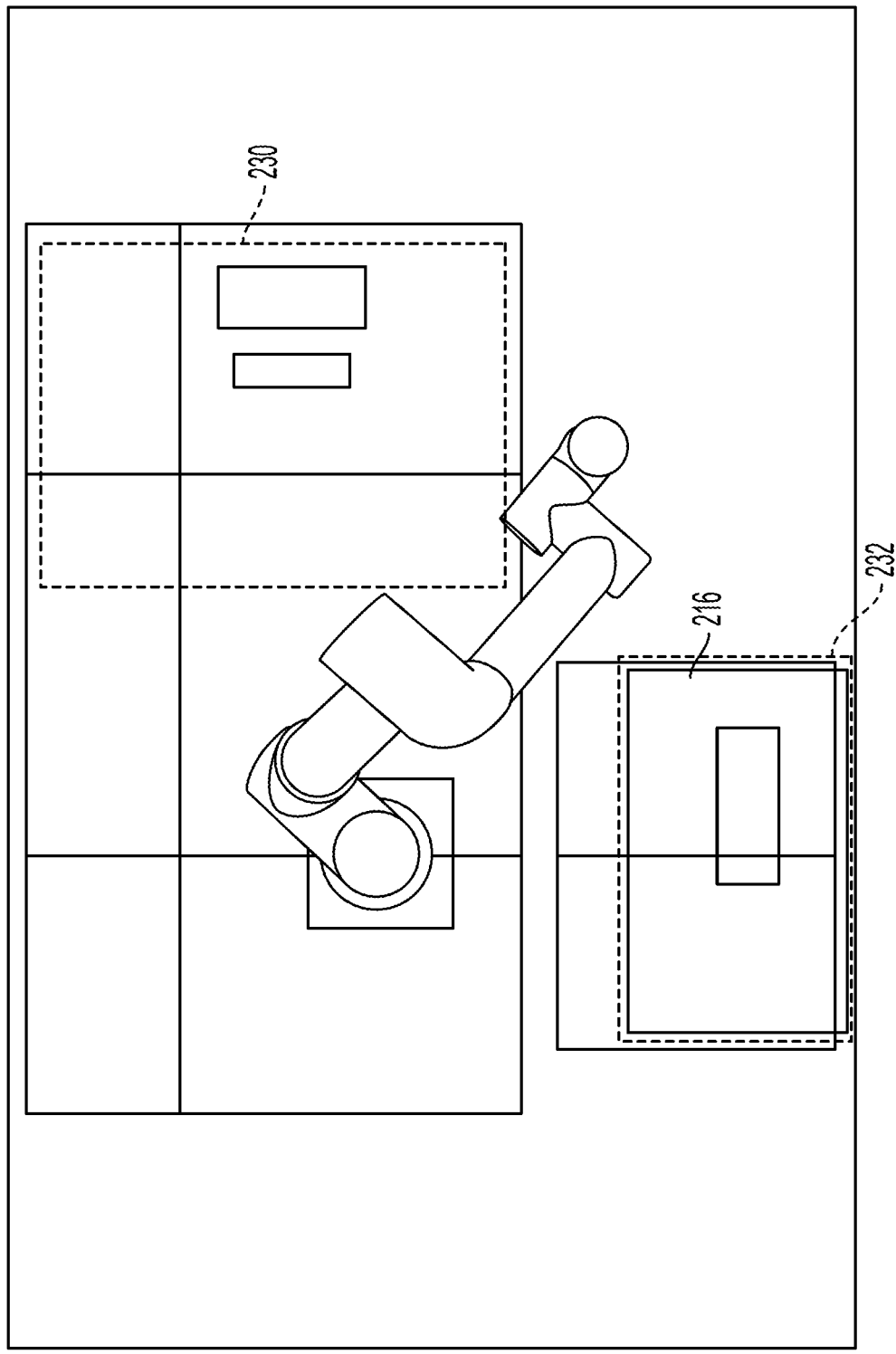

AUTONOMOUS ROBOT PACKAGING OF ARBITRARY OBJECTS

CROSS-REFERENCE TO RELATED APPLICATION

This application claims priority to U.S. provisional patent application No. 63/051,956, filed Jul. 15, 2020, which is hereby incorporated by reference in its entirety.

BACKGROUND

With the unprecedented growth of the E-Commerce market, warehouse automation has attracted much interest and capital investments. Consumers are placing online orders at continually increasing rates, the majority of which need to be shipped. Therefore, there is a need to quickly and efficiently pack packages to mail.

Currently, package fulfillment, or the packing of packages, is primarily performed by human workers in a warehouse. Human packers often choose containers with excessive dimensions to make packing easier, incurring waste and high shipping costs, and high-density packing can be cognitively taxing. In comparison, package fulfillment automation brings possible benefits such as increased uptime, higher total throughput, and lower accident rates. Existing automated loading systems, such as those designed for mixed palletizing of boxes, however, often cannot handle a wide range of objects reliably enough for commercial use. In order to reliably handle the diverse variety of items found in E-Commerce settings, so-called "intelligent" automation systems will need to perform object recognition, calculate of packing plans, and correct for unforeseen errors in the packing process.

SUMMARY

The embodiments described herein provide methods and systems to identify objects to be packed by creating a three-dimensional model of the object, generating a packing plan, packing a shipping container, and, if packed items in a shipping container do not match the packing plan, either correcting the error or updating the packing plan. The system can pick from a set of arbitrarily shaped objects on a flat picking area and packs them in a shipping box. A planning algorithm can produce robot packing plans, 3D models of each object to pack, assuming a given location and dimensions of the box, and initial object locations. This input can be produced using a calibration setup step and a vision system to perform object detection and three-dimensional model acquisition. The robot can then execute grasping and stowing motions to place each object into the container as planned.

The uncertainties in the system can include object modeling errors, such as incorrectly estimated object shapes, poses, deformation, etc., manipulation errors, such as failed grasps, object reorientation during grasping, as well as other system-level uncertainties such as calibration error. Two possible strategies can mitigate the impact of uncertainties and increase the robustness of the packing execution. The first strategy could be to plan conservatively during the offline planning phase in an attempt to ensure a plan execution remains feasible even under positioning error. For example, the planner may include geometric margins in three dimensional models of the objects to ensure that inadvertent collisions are not introduced by positioning errors. The second strategy could be to employ closed-loop vision and manipulation so that a robot can dynamically react to errors and correct them. For example, the system could re-sense the object pile after each placement using visual and depth information and then re-plan subsequent object placements if the pile deviates from the plan.

Accordingly, a first example embodiment may involve a system for packing objects in a container. The system may include a robotic device that has a robotic arm, a plurality of object detection sensors, and a controller. The controller may include at least one processor and a non-transitory computer readable medium. The non-transitory computer readable medium may store a set of program instructions and the at least one processor may execute the program instructions so as to carry out operations. The operations may include sensing a measurement of each object among a plurality of objects with at least one object detection sensor of the plurality of object detection sensors, obtaining a three-dimensional model for each object in the plurality of objects, determining a packing plan for the plurality of objects based on the three-dimensional model for each object, and loading, by a robotic arm, at least a portion of the plurality of objects into a container according to the packing plan for the plurality of objects.

In another example embodiment, the present disclosure describes a method for generating a three-dimensional model to train a machine learning model. The method may include scanning a plurality of objects with at least one object detection sensor in a plurality of object detection sensors, segmenting a point cloud for each object in the plurality of objects, projecting the point cloud for each object in the plurality of objects onto an image obtained by at least one object detection sensor of the plurality of object detection sensors for each object in the plurality of objects to obtain a region of interest, generating a three-dimensional model for each object in the plurality of objects based on the region of interest, assigning at least one parameter to the three-dimensional model for each object, and training a machine learning model based on the assigned at least one parameter.

In a further example embodiment, the present disclosure describes a method for packing objects in a container. The method may include sensing a plurality of objects with at least one object detection sensor of a plurality of object detection sensors, obtaining a three-dimensional model for each object in the plurality of objects, determining a packing plan for the plurality of objects based on the three-dimensional model for each object, loading, by a robotic arm, at least a portion of the plurality of objects into a container according to the packing plan for the plurality of objects, sensing, by a plurality of object detection sensors, a content placement within the container, determining a deviation from the packing plan, and based on the deviation from the packing plan, performing at least one of: moving the object thereby correcting the deviation, or adjusting a remainder of the packing plan.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

Example embodiments should become apparent from the following description, which is given by way of example only, of at least one preferred but non-limiting embodiment, described in connection with the accompanying figures.

FIG. 2A illustrates a perspective view of a system for packing objects, according to an example embodiment.

FIG. 2C illustrates a top-down view of a system for packing objects, according to an example embodiment.

DETAILED DESCRIPTION

Figure 1:
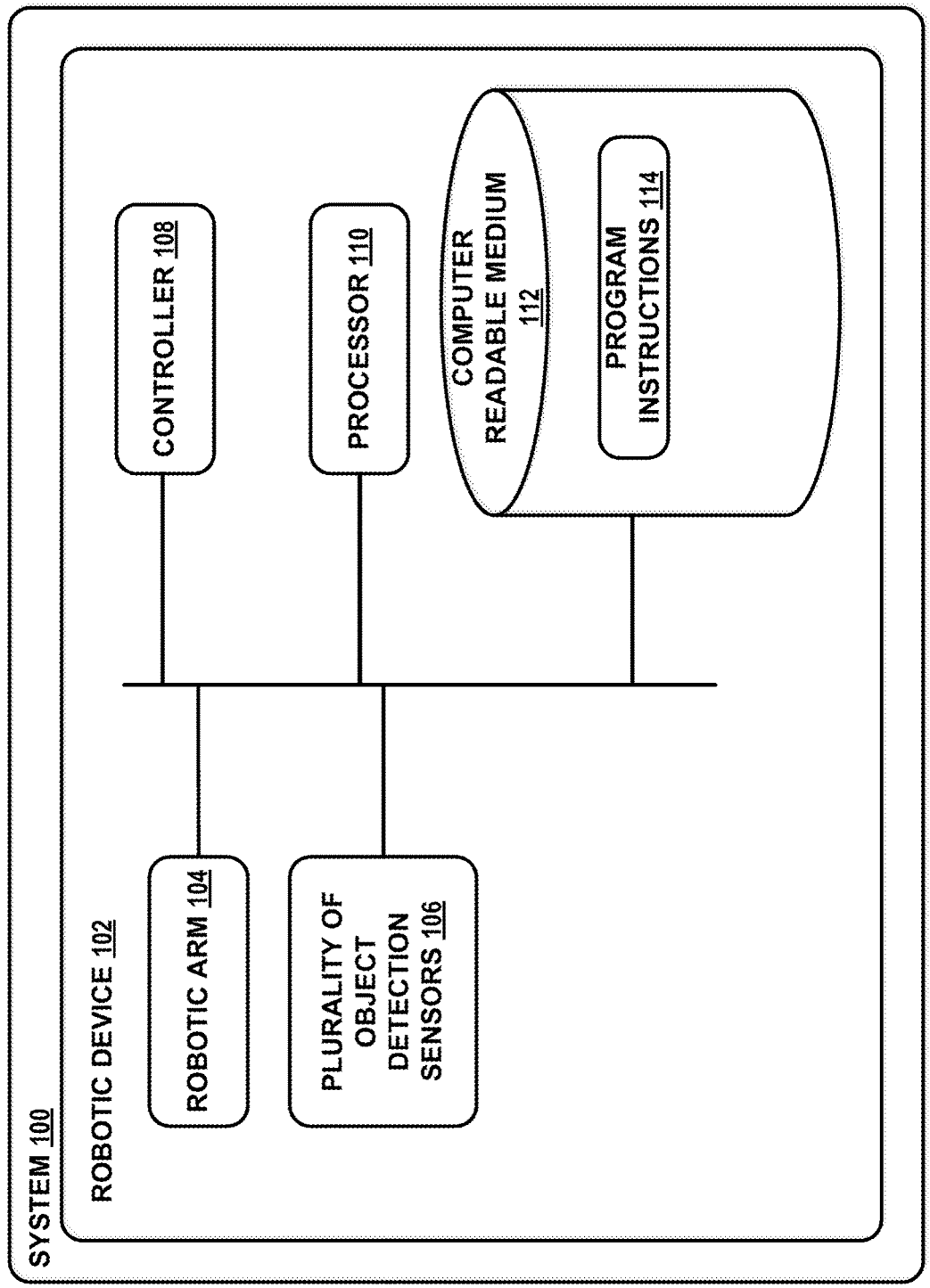
FIG. 1 illustrates a system for packing objects, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

With the unprecedented growth of the E-Commerce market, warehouse automation has attracted much interest and capital investment. Compared to a conventional labor-intensive approach, an automated robot warehouse brings possible benefits such as increased uptime, higher total throughput, and lower accident rates. In particular, one emerging area of warehousing automation that attracts a lot of research attention is automated packaging or packing, a process during which robots stow objects into containers.

Package fulfillment is one important packaging task, in which customer orders consisting of a set of items are packed into one or more shipping boxes. Currently, this is primarily performed by human workers in a warehouse, which leaves the container size selection largely to intuition or trial and error. As a result, over-sized containers are often used, incurring waste and high shipping costs. Size appropriate containers and packing plans could be chosen using automated algorithms. An automated system that optimizes container sizes and packing plans executable by a robot could lead to major cost savings for large warehouses.

However, it remains a challenge to design an automated packing system that handles a wide range of objects reliably enough for commercial use. Because optimized packing plans usually involve dense packing, small disturbances can cause serious, cascading failures. For example, if an object unexpectedly shifts during execution, it will likely leave insufficient space for remaining items in the container. Such failures can be difficult and time-consuming to recover from, e.g., by removing all placed items in the old box and replacing them in a larger box. Moreover, failures could cause damage to the objects, since an industrial robot can be stiffly geared and blind execution of pre-planned paths can exert very high forces when an unexpected obstacle is encountered.

An example embodiment of the following disclosure describes an automated packing system that recognizes objects for packing, generates a packing plan and container size, analyzes various sources of uncertainty inherent to automated packing systems, packs the objects into containers, and corrects for any errors in the packing plan.

Embodiments described herein may use state-of-the-art perception and planning components. The system can pick from a set of arbitrarily shaped objects on a flat picking area and pack them in a shipping box. For example, the system may sense the objects placed in the picking area and dynamically construct a realistic three-dimensional model for each of the objects to input into an algorithm for a packing plan. One embodiment describes a packing plan algorithm that produces robot packing plans, assuming a given location and dimensions of the box, and initial object locations. The system may produce the input for the packing plan using a calibration setup step and a vision system to perform object detection and three-dimensional model acquisition. The robotic device may then execute grasping and stowing motion to place each object into the container as planned and may also correct any packing errors and update the packing plan dynamically.

Most existing packing algorithms make assumptions that are unrealistic in the fulfillment setting, such as rectilinear objects and floating objects not subject to the force of gravity. To enable automated fulfillment, several issues need to be addressed in the packing plan, such as stability under force of gravity, and kinematics and clearance issues for the robot.

For a packing plan to be feasible when executed by a robot manipulator, it must obey several constraints. These constraints may include noninterference: each object is collision free, containment: all objects are placed within the internal space of the container, stability: each object is stable against previously packed objects and the bin itself, and manipulation feasibility: a feasible robot motion exists to load the object into the target placement. The robot should obey kinematic constraints, grasp constraints, and collision constraints during this motion.

To address the packing problem, the disclosure describes a polynomial time constructive algorithm to implement a resolution-complete search amongst feasible object placements, under robot-packable constraints, a three-dimensional positioning heuristic named Heightmap-Minimization (HM) that minimizes the volume increase of the object pile from the loading direction, and a fast prioritized search scheme. The scheme may first hypothesize candidate planar-stable orientations in which an object is likely to stably rest in the plane. For each orientation, the search attempts to find a robot-packable placement by iterating options for parameters in two horizontal axes and a vertical rotation axis. Once the planar-stable orientation and these three parameters are defined, the height of the placement may be calculated by matching the bottom surface of the object to the top surface of the existing packed objects. The candidate placement may then be checked for constraint satisfaction. If no candidate placement is found when all options are exhausted, the method may fall back to a slower search in a five-dimensional parameter space, which includes options for the parameters in the two horizontal axes and three rotation axes.

This disclosure also describes a method for correcting errors and uncertainties in the packing plan once a packing plan has been established. Uncertainties in the system can include object modeling errors, such as incorrectly estimated object shapes, poses, deformation, etc., manipulation errors, such as failed grasps, object reorientation during grasping, as well as other system-level uncertainties such as calibration error. The following disclosure also describes two strategies to mitigate the impact of uncertainties and increase the robustness of the packing execution. The first strategy is to plan conservatively during the offline packing plan phase to attempt to improve execution feasibility under positioning error. For example, by including geometric margins in three dimensional models of the objects, the likelihood of collision under positioning error is reduced. The second strategy is to employ closed-loop vision and manipulation so that a robotic device can dynamically react to errors and correct them. For example, the system may re-sense the object pile after each placement using visual and depth information and then re-plan the best subsequent placements if the pile deviates from the plan.

In an example embodiment, an offline placement algorithm may be used for complex shaped, non-convex objects. The algorithm may be used for offline packing of three-dimensional irregular shapes into a single container while attempting to ensure the stability of each packed item and feasibility of the placement with a robot gripper.

For a set N geometries $G_1, \ldots, G_N$ where $G_i \subset R^3$, let C donate the free space volume of the container and $\partial C$ as the boundary of the free space. Let $T_i \cdot G_i$ denote the space occupied by item i when the geometry is transformed by $T_i$. The problem is to find a placement sequence $S=(s_1, \ldots, s_N)$ of $\{1, \ldots, N\}$ and transforms $T=(T_1, \ldots, T_N)$ such that each placement satisfies non-overlapping and containment constraints with geometries placed prior:

$$(T_i \cdot G_i) \cap (P_j \cdot G_j) = \emptyset, \forall i, j \in \{1, \ldots, N\}, i \neq j \quad (1)$$

$$(T_i \cdot G_i) \subseteq C, \forall |i \in \{1, \ldots, N\} \quad (2)$$

And for each k=1, ..., N, stability constraints:

$$isStable\left(P_{s_k} \cdot G_{s_k}, C, T_{s_1} \cdot G_{s_1}, \ldots P_{s_{k-1}} \cdot G_{s_{k-1}}\right) \quad (3)$$

And manipulation feasibility constraints:

$$isManipFeasible\left(P_{s_k} \cdot G_{s_k}, C, T_{s_1} \cdot G_{s_1}, \ldots P_{s_{k-1}} \cdot G_{s_{k-1}}\right) \quad (4)$$

Note that both stability and manipulation feasibility constraints should be satisfied for every intermediate arrangement of objects, not just the final arrangement.

Stability checking: Stability is defined as the condition in which all placed items are in static equilibrium under gravity and frictional contact forces. The stack is modeled using point contacts with a Coulomb friction model with a known coefficient of static friction. Let the set of contact points be denoted as $c_1, \ldots, c_k$, which have normals $n_1, \ldots, n_N$, and two friction coefficients $\mu_1, \ldots, \mu_k$. For each contact $c_k$, let the two bodies in contact be denoted $A_k$ and $B_k$. Let $f_1, \ldots, f_K$ denote the contact forces, with the convention that $f_k$ is applied to $B_k$ and the negative is applied to $A_k$. $m_i$ is also defined as the mass of object i, and $cm_i$ as its center of mass. The container is assumed to have infinite mass.

The object pile may be in static equilibrium if there are a set of forces that satisfy the following conditions.

Force balance:

$$\forall i = 1, \ldots, N, -\sum_{k|i=A_k} f_k + \sum_{k|i=B_k} f_k + m_i g = 0. \quad (5)$$

Torque balance:

$$\forall i = 1, \ldots, N,$$

$$-\sum_{k|i=A_k} (cm_i - c_k) \times f_k + \sum_{k|i=B_k} (cm_i - c_k) \times f_k = 0.$$

Force validity:

$$\forall k = 1, \ldots, K,$$

$$f_k \cdot n_k > 0, \quad (6)$$

$$\|f_k^\perp\| \leq \mu_k(f_k \cdot n_k) \quad (7)$$

Where $\|f_k^\perp\|\mu_k(f_k \cdot n_k)$ is the tangential component (i.e., frictional force) of $f_k$.

For a given arrangement of objects, an approximate set of contact points can be obtained with the slightly scaled geometries in placement. A pyramidal approximation for the friction cone may be used, and the conditions above can be formulated as a linear programming problem over $f_1, \ldots, f_N$, solved using a convex programming solver. If no such forces can be found, the arrangement is considered unstable.

Manipulation feasibility: This constraint can check feasibility of a packing pose when executed by a robot manipulator. For this, the object should be graspable from its initial pose and can be packed in the desired pose via a continuous motion, without colliding with environmental obstacles.

In an example embodiment, there may be a feasible top-down placement trajectory within the grasp constraints, as robots performing pick and place (e.g., box packing) commonly use vertical motion. The existence of a grasp generator that produces some number of candidate end effector (EE) transforms may also be assumed, specified relative to an object's geometry that may be used to grasp the object. The pseudo-code for this procedure is given in Algorithm 1.

---

Algorithm 1: isManipFeasible

--- input : Desired placed geometry T · G and a set of grasp candidates $\{T_1^G, \ldots T_n^G\}$
1  for    $T^G \in \{T_1^G, \ldots T_n^G\}$ do
2  |    Compute top-down EE path $P_{ee}$ interpolating from an elevated pose to a final pose $T \cdot T^G$;
3  |    for    $P_{ee} \in P_{ee}$ do
4  |    |    if ¬(IKSolvable ($P_{ee}$) ∧ inJointLimits($P_{ee}$) ∧ collisionFree($P_{ee}$)) then Continue with Line 1;
5  |    end
6  |    return True
7  end
8  return False

---

II. Example Systems for Packing Objects in a Container

FIG. 1 illustrates an example embodiment of a system 100 for packing objects in a container. The system may include a robotic device 102. The robotic device 102 may be a variety of robots including a 6R industrial robot, such as a Universal Robots UR5e. The robotic device may further include a robotic arm 104. The robotic arm 104 may be a variety of shapes. For example, the robotic arm may be an articulated arm for the arm to bend in multiple directions. Alternatively, the robotic arm may operate as a Cartesian arm, a cylindrical arm, a spherical arm, or a SCARA arm. The system may also include a plurality of object detection sensors 106. The plurality of object detection sensors 106 may be used to sense a plurality of objects that are to be packed in a container. The object detection sensors 106 may therefore be chosen from a wide variety of sensor types. The plurality of sensors may also be a combination of sensor types.

The system may further include a controller 108. The controller 108 may include at least one processor 110 and a non-transitory computer readable medium 112. In an example embodiment, the controller 108 and processor 110 may be part of a computing system. The non-transitory computer readable medium 112 may further store a set of program instructions 114 for the processor 110 to execute and carry out operations. The operations may include sensing and isolating each object among a plurality of objects with at least one object detection sensor of the plurality of object detection sensors. The operations may further include obtaining a three-dimensional model for each object in the plurality of objects. The three-dimensional models may be selected from among a plurality of predetermined three-dimensional models provided by a trained machine learning model. Alternatively, the system may dynamically generate a three-dimensional model of the object if a model is not available by the trained machine learning model. The operations may further include determining a packing plan for the plurality of objects based on the three-dimensional model for each object, and loading, by the robotic arm, at least a portion of the plurality of objects into a container according to the packing plan for the plurality of objects.

In operation, the plurality of objects may be placed on a tabletop in arbitrary locations awaiting loading into containers. The system may assume that objects are drawn from a known set, whose three-dimensional models are available. In addition, the objects awaiting packing may be packed with their initial locations not touching. If the objects awaiting to be packed are touching, the robotic arm may manipulate the objects. For example, the objects may be separated by solving a singulation problem. A predetermined box footprint area may be marked off in a packing area, and a box with matching dimensions may be aligned with the footprint.

The software pipeline for operation may consist of calibration, perception, and planning. The calibration steps may include: using factory-specified tool center point and camera intrinsic parameters, camera extrinsic calibration using a robot-mounted checkerboard, calibrating the box footprint location by jogging the robot to touch the footprint corner locations and the footprint corners are set to the tool center point coordinates relative to the robot base.

Once the robotic device 102 is calibrated, object identification and object pose estimation may then be performed. Object identification may include sensing each object in the plurality of objects on the table top with the plurality of object detection sensors 106 and generating a point cloud for each object in the plurality of objects. Each object in the plurality of objects may then be isolated by performing plane segmentation to remove the tabletop from the point cloud. Region growing segmentation may be used for the point cloud segmenting. Region growing segmentation identifies a network whereby points in the point cloud with similar location, geometry, and visual properties are connected by a link, and connected groups in the network are extracted as object segments. The segmented point cloud of each object in the plurality of objects may then be projected onto an image of the plurality of objects to obtain a region of interest for each object in the plurality of objects. The object identified in the region of interest is then identified by using a convolutional neural network model, trained on the experiment objects. A convolutional neural network (CNN) pose estimation model gives an initial estimate of object pose and if fitness of the CNN estimation is below a threshold, point cloud only template matching using iterative closest points is performed. Iterative closest points iteratively identifies a set of matching pairs of points between a three-dimensional model and the point cloud, then adjusts the model pose to align the matching pairs to one another, and repeats to determine a pose of a three-dimensional model. If a matching three-dimensional model is not found in the trained machine learning model, the system may dynamically create a three-dimensional model.

Once an object has a three-dimensional model, the packing plan chooses an object packing sequence and generates a grasp location and packing pose for each object. The robotic arm loads the objects into the container by way of an open top of the container. The system dynamically checks several constraints including: that none of the sensors on the robotic device register an excessive force on the gripper of the robotic device, that the object is misaligned with the gripper, that the loading trajectory is collision-free with the container position and objects already placed, and the stability of the object under gravity in a stack of objects in the container.

To check these constraints, the system may further sense, with the plurality of object detection sensors, a content placement within the container. For example, the system may dynamically receive feedback from the plurality of object detection sensors in the system during and after packing execution with the robot arm. The feedback might include force feedback to prevent crushing items, and overhead image feedback to determine how objects were packed in the container. The feedback from the plurality of object detection sensors 106 may assist the system in determining that there was a deviation from the packing plan based on the content placement within the container. Based on the deviation from the packing plan, the system may move the object in the container with the gripper of the robotic arm, thereby correcting the deviation, and/or the processor may adjust a remainder of the packing plan to pack the remaining objects in the container around the object causing the deviation.

FIG. 2A illustrates an example embodiment of the robotic device 202 in the system 200 for packing objects in the container 216. The robotic device 202 may include an end effector 218 to manipulate objects in the plurality of objects 220 into the container 216. The end effector 218 may be chosen from a plurality of possible effectors to move objects. For example, the end effector could be a vacuum gripper, a pneumatic gripper, a hydraulic gripper, a magnetic gripper, or a servo-electric gripper. In an example embodiment, the end effector may be a suction gripper such as a Robotiq EPick paired with a compliant suction cup. The gripper could also be a cylindrical vacuum gripper of 30 centimeter length and 2 centimeter diameter.

Figure 2B:
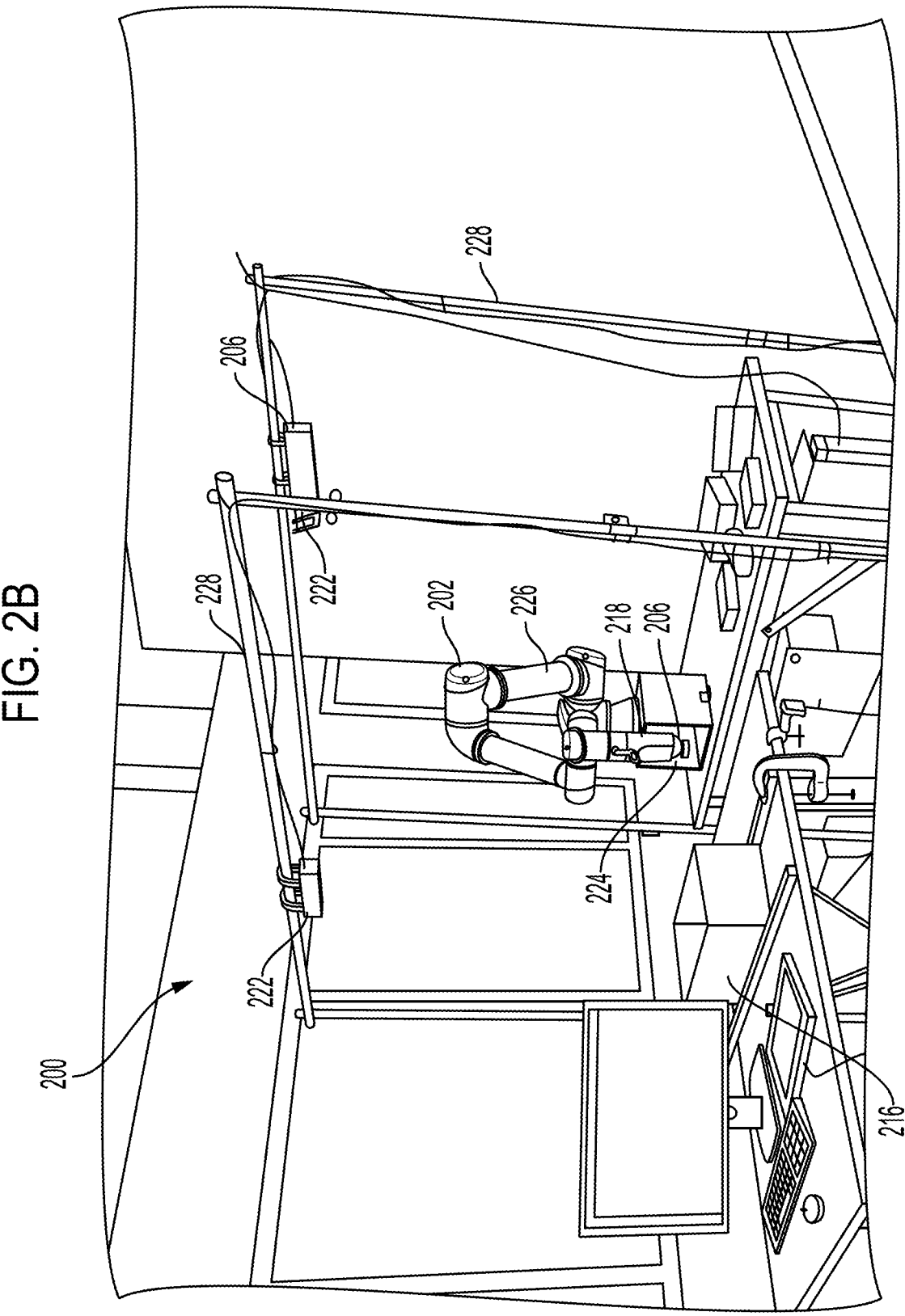
FIG. 2B illustrates a perspective view of a system for packing objects, according to an example embodiment.

FIG. 2B illustrates another example embodiment of the robotic device 202 in the system 200 for packing objects in the container 216. In an example embodiment, the plurality of object detection sensors 206 for the robotic device 202 might include at least one of a LIDAR sensor, a vision sensor 222, or a force-torque sensor 224. The force-torque sensor 224 may be mounted to the robotic arm 226 to sense if the robotic arm 226 collided with an object, or if the robotic arm 226 misplaced an object in the container.

The robotic device may further include a frame 228. The frame 228 may be a structure that runs over the picking area 230 and the packing area 232. For example, the frame 228 may be a plurality of rods that make a cube over and around the area of operation. An example top down view from the frame is shown in FIG. 2C. Alternatively, the frame may include walls. Alternatively still, the frame may be any shape that extends over the area where the objects are placed awaiting packing, and the container. At least a portion of the vision sensors 222 may be coupled to the frame 228 so as to sense how the objects are placed awaiting packing within the picking area and how the objects were packed in the container. The vision sensors 222 may be positioned on the frame 228 such that they are above the picking area and the packing area. The plurality of the plurality of vision sensors 222 may be chosen from a variety of sensors. For example, the vision sensors may be at least one of a LIDAR sensor, a depth sensor, or a camera. In an example embodiment, the vision sensors are Red, Green, Blue depth (RGB-D) cameras and high resolution stereo/structured light black-and-white depth cameras. An RGB-D camera and stereo camera may be mounted over-head on the frame looking down on the picking area, while a stereo camera may be positioned above the packing area. This setup allows for the combination of the color information from the RGB-D camera and the high-quality point clouds from the stereo cameras. The high-quality point cloud enables the pose recognition pipeline to achieve better accuracy compared to the RGB-D data.

The container 216 that the plurality of objects are packing into may be chosen from a discrete set of containers. In the set, the containers may vary in size. The system may determine the container of smallest size or minimal cost to pack the plurality of objects into in order to reduce waste. Once the container is determined, the appropriate container may be placed in the packing area awaiting loading.

III. Example Model Training Methods

Figure 3:
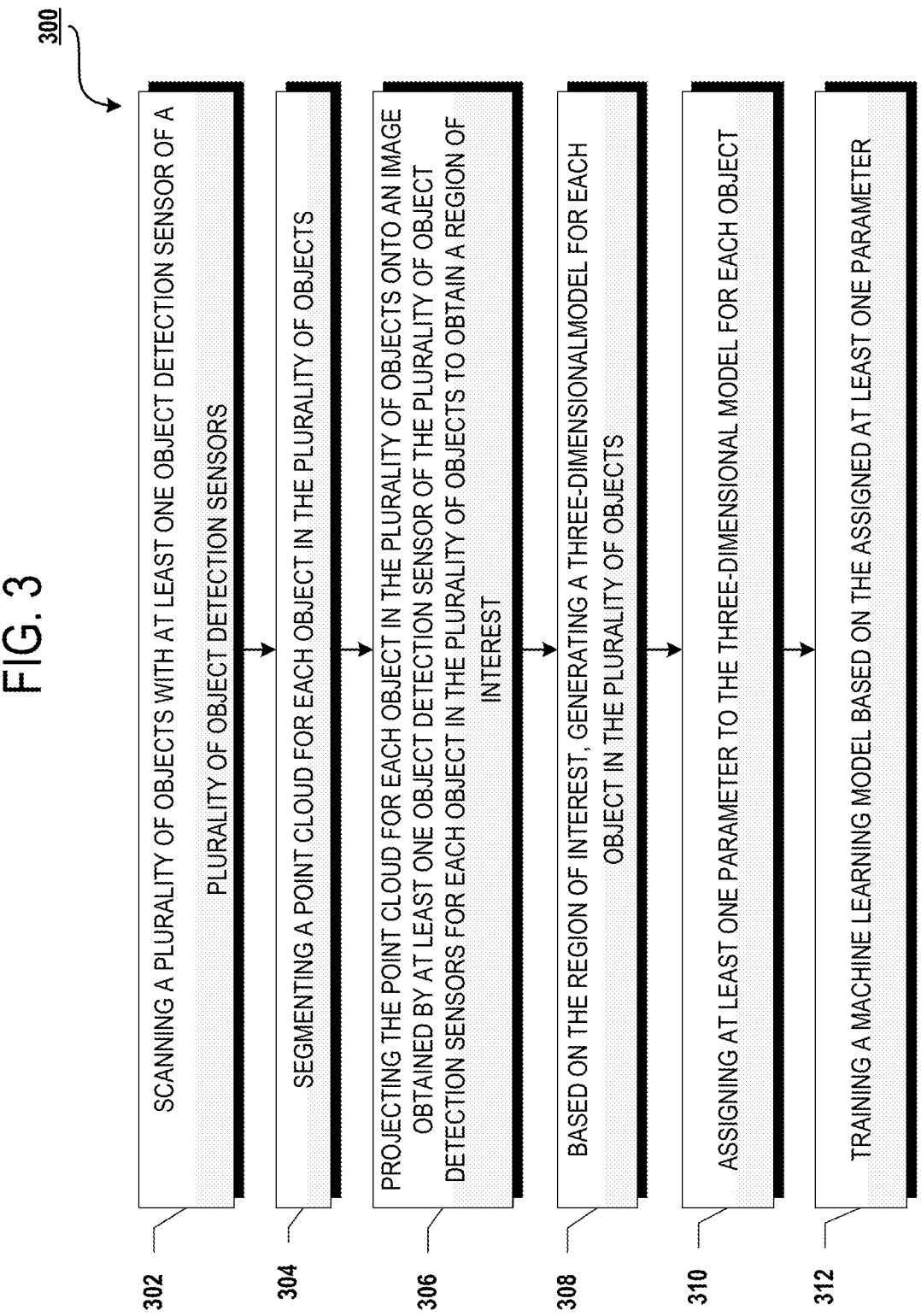
FIG. 3 illustrates a flow chart of a method for training a machine learning model to generate a three-dimensional model, according to an example embodiment.

In the packing process, the system may use a three-dimensional model of an object to generate a packing plan. The three-dimensional model may be selected from a plurality of predetermined three-dimensional models using identification provided by a trained machine learning model. FIG. 3 illustrates a method for training a machine learning model to generate a three-dimensional model. The method may include scanning a plurality of objects with at least one object detection sensor of a plurality of object detection sensors 302. The plurality of objects may be placed in a picking area for the system to scan with the object detection sensors. As previously discussed, in an example embodiment the object detection sensors may be vision sensors that are Red, Green, Blue depth (RGB-D) cameras and high resolution stereo/structured light black-and-white depth cameras. Once a scan of the plurality of objects is obtained, each object among the plurality of objects may be isolated from the table top on which they sit, and each object may be isolated from the other. A computing system included in the system 100 may segment a point cloud for each object in the plurality of objects 304 to isolate the objects. Thus, each segment may contain only readings from one object.

Following point cloud segmentation, each segmented point cloud for each object in the plurality of objects may be projected onto an image obtained by at least one object detection sensor of the plurality of object detection sensors for each object in the plurality of objects to obtain a region of interest 306. In an example embodiment, the image obtained by the at least one object detection sensor for each object in the plurality of objects is at least one of: a black and white image, a red green blue image, a cyan magenta yellow black image, a depth image or a heat map. Based on the region of interest, a three-dimensional model for each object in the plurality of objects may be generated 308. In an example embodiment, the model may be a triangular mesh model of the object generated using a triangulation algorithm. The method may further include assigning at least one parameter to the three-dimensional model for each object 310. In an example embodiment, the identification of the object may be classified with ResNet18, trained on an experiment dataset of objects using PyTorch. Training weight may be initialized with ImageNet weight, fine-tuned on a customized dataset with at least 100 images for each item in an experiment item set. A machine learning model may be trained based on the assigned at least one parameter 312. Parameters that are stored for the machine learning model include object identification and physical characteristics such as mass, center of mass, and material characteristics.

In an example embodiment, once the plurality of objects has been scanned, the computing system may isolate each object among the plurality of objects as previously discussed. Isolating each object in the plurality of objects may include using a plane segmentation operation and data clustering operation such as region-growing segmentation. These operations may be performed by an algorithm automatically. By automatically using plane segmentation and data clustering, each object in the plurality of objects may be isolated from the table top and from each other.

IV. Example Applications of Trained Models

Figure 4:
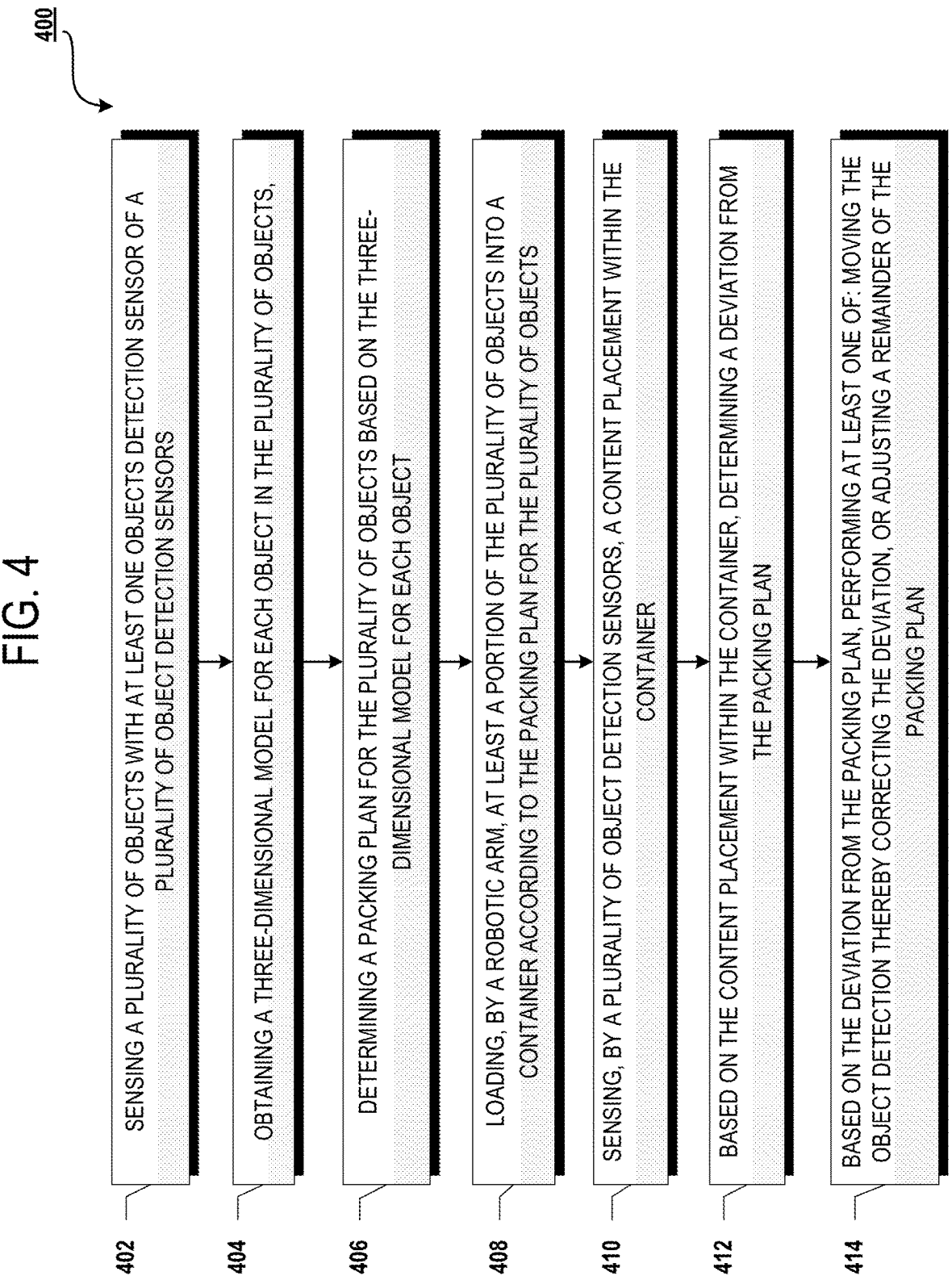
FIG. 4 illustrates a flow chart of a method for packing objects in a container, according to an example embodiment.

The above described system and method for training a machine learning model may further be used with a method for packing objects in a container. The method may attempt to improve space utilization inside a container, stability of the object pile during packing and the robot motion executing the placement plans. The method may further attempt to improve solving errors that occur during the packing process. A method for packing objects in a container is illustrated in FIG. 4.

A plurality of objects that are selected for packing may be placed in a picking area. The method may include sensing the plurality of objects with at least one object detection sensor of a plurality of object detection sensors 402. As previously discussed, in an example embodiment the object detection sensors may be vision sensors that are Red, Green, Blue depth (RGB-D) cameras and high resolution stereo/structured light black-and-white depth cameras. The data gathered by the sensors may be used in obtaining a three-dimensional model for each object in the plurality of objects 404. The method may obtain a three-dimensional model for each object in the plurality of objects in multiple ways. For example, retrieving a matched object model from a database of reference three-dimensional models using machine learning models and a three-dimensional pose matching algorithm to match the region of interest of the object to the selected reference model, or determining an estimate of one or more hidden surfaces of the object using extrapolation from one or more visible peripheries of the object in the region of interest to dynamically acquire a three-dimensional model.

In example embodiments, obtaining a three-dimensional model for each object in the plurality of objects may include isolating each object in the plurality of objects from each object and from the table top, segmenting a point cloud for each object in the plurality of objects, and projecting the segmented point cloud for each object in the plurality of objects onto an image obtained by an overhead sensor for each object in the plurality of objects to obtain a region of interest. Once the region of interest is obtained, the region can be used in determining whether there is a match between a region of interest for each object in the plurality of objects and a plurality of predetermined three-dimensional models provided by a trained machine learning model. If a match exists, an example embodiment of the method may include selecting a three-dimensional model for each object in the plurality of objects. The three-dimensional model selected from the plurality of three-dimensional models may then be used as the input for determining a packing plan.

In another example embodiment, obtaining a three-dimensional model for each object in the plurality of objects may include segmenting a point cloud for each object in the plurality of objects by isolating each object in the plurality of objects from each object and from the table top, and projecting the segmented point cloud for each object in the plurality of objects onto an image obtained by an overhead sensor for each object in the plurality of objects to obtain a region of interest. Once the region of interest is obtained, the region can be used in determining that there may be no match between a region of interest for at least one no match object in the plurality of objects and a plurality of predetermined three-dimensional models provided by a trained machine learning model. For each no-match object, the method may include dynamically generating a three-dimensional model. Dynamic model acquisition may acquire models at various resolutions, from bounding box estimations to highly accurate 3D scans (e.g., registering multiple views with known transforms). The object detection sensors may detect the objects placed in the picking area. When acquiring the models, the computing system may assume that the objects to be packed have flat bottoms and sit on the table top of the picking area. After the computing system performs plane removal and point cloud segmentation for each object in the plurality of objects to be packed, each point cloud segment may be completed by concatenating surface points with its projection on the underlying plane. The completed point cloud may then go through a triangulation algorithm such as Poisson surface reconstruction to obtain the watertight triangular mesh model. For items with surface material easily captured by a depth camera, i.e. not reflective or transparent, and whose size can be estimated well with boxes or planner surfaces, low-resolution shape estimation can be used. For irregularly shaped objects, particularly those that are highly concave (e.g., bowls), high-resolution modeling or known models may be used in applications where high-density packing is critical or delicate items are to be handled. The dynamically generated three-dimensional model may then be used as the input for determining the packing plan.

Once a three dimensional model for each object in the plurality of objects is obtained, the method may include determining a packing plan for the plurality of objects based on the three-dimensional model for each object 406.

The packing plan may include a model of the stack of packages in the container, using the three-dimensional models of the plurality of objects. The model may ensure that the plurality of objects are stable within the container by performing stability checks. Stability is defined as the condition in which all placed items are in static equilibrium under gravity and frictional contact forces. The stack of objects in the container may be modeled using point contacts with a Coulomb friction model with a known coefficient of static friction.

The packing plan may also address the feasibility of a chosen packing pose of an object in the container when executed by the robotic device. This requires that the object be graspable from its initial pose and can be packed in the desired pose via a continuous motion, without colliding with environmental obstacles. In an example embodiment, the method may focus on the existence of a feasible top-down placement trajectory within the grasp constraints, as robotic devices performing pick and place (e.g., box packing) commonly use vertical motion. However, in an alternative embodiment the method may focus on a different placement trajectory such as from the side.

The packing plan may additionally accept the plurality of objects, the smallest container dimension for the objects, a constructive positioning heuristic, and/or a packing sequence to produce the packing plan. A packing pipeline packs each item in its optimized feasible pose in sequential order, without backtracking. An example pipeline may consist of four components, namely: Placement sequence, Generate ranked transforms, Stability check and Manipulation feasibility check.

The pipeline for robot-packable planning may employ a sequencing heuristic to sort all items in a tentative placement ordering and allocate them individually into the container in the sequence. For each object at the time of the allocation, a set of candidate transforms satisfying robot-packable constraints may be generated and ranked based on the positioning heuristic. Constraint checks may be performed in order until a transform satisfying all required constraints is returned. The packing plan may also include generating ranked transforms to rank candidate placements for objects in the container using a score formulated from a positioning heuristic. The candidate placements are obtained with a prioritized search among a discretized set of object poses.

The placement sequence can be user-specified or generated by a non-increasing bounding box volume rule. The generated sequence may be subject to adjustment if a solution cannot be found in the specified ordering.

For a given item, a positioning heuristic (e.g., placement rule) may identify a free pose inside the container that is most preferred according to a specific criterion. The pipeline for robot-packable planning may accept arbitrary positioning heuristics, but instead of applying the heuristic to obtain one optimal placement for each item, the pipeline may utilize the score formulated from the positioning heuristic to rank candidate placements. The candidate placements may be obtained with a prioritized search among a discretized set of object poses. Instead of searching in the 6D space of SE(3), the algorithm for robot-packable planning may first perform a grid search in a 3D space that likely contains robot-packable solutions. In the 3D search, the rolls and pitches of G may be restricted to be a set of planar-stable orientations, which are a set of stable resting orientations of G on a planar surface. The set of stable resting orientations of G on the planner surface may be computed. This may assist in speeding up the search for the common case of packing on the first layer and on horizontal supports. If no feasible solutions exist in the 3D space, the robot-packable planning algorithm may fall back to search in 5D, in which a grid search is performed for rolls and pitches as well.

The 3D search for collision-free placements of one object, given a set of rolls and pitches, is shown in Alg. 2. A grid search may be performed for yaw, X, and Y at a given resolution, and the height Z of the placement may be analytically determined as the lowest free placement. Two dimensional heightmaps may be used to accelerate the computation of Z to an efficient two dimensional matrix manipulation. Three heightmaps may be computed: 1) a top-down heightmap He of the container and placed objects, 2) a top-down heightmap $H_t$ of the object to be placed, and 3) a bottom-up heightmap $H_b$ of the object to be placed. $H_t$ and $H_b$ may be measured relative to the lower left corner of the orientated object. Raycasting may be used to build these heightmaps, and rays that do not intersect with the object geometry may be given a height 0 in $H_t$ and $\infty$ in $H_b$. The container heightmap may be obtained once at the beginning of object placement search, and an object heightmap may be computed once for each distinct searched orientation.

| | Algorithm 2: 3DGridSearch |
|---|---|
| | input : Geometry G, container C, rolls and pitches O |
| | output: All collision-free candidate transforms |
| 1 | for $(\phi, \psi) \in O$ do |
| 2 |    for $\theta \in \{0, \Delta r, 2\Delta r, \ldots, 2\pi - \Delta r\}$ do |
| 3 |       Let $R \leftarrow R_z(\theta)R_y(\phi)R_x(\psi)$; |
| 4 |       Discretize legal horizontal translations of R · G into grid $\{(X_1, Y_1), \ldots (X_n, Y_n)\}$; |
| 5 |       for $\{X, Y\}$ in $\{(X_1, Y_1), \ldots (X_n, Y_n)\}$ do |
| 6 |          Find the lowest collision free placement Z at translation X, Y; |
| 7 |          $T \leftarrow \{R, (X, Y, Z)\}$; |
| 8 |          if T · G lies within C then Add T to $\tau$; |
| 9 |       end |
| 10 |    end |
| 11 | end |
| 12 | return $\tau$ |

Given an object orientation and X, Y location, the lowest collision-free Z may be calculated as follows:

$$Z = \max_{w-1, i=0} \max_{h-1, j=0} (H_c[x+i, y+j] - H_b[i, j]) \quad (8)$$

where (x, y) are the pixel coordinates of X, Y, and (w, h) to be the dimensions of $H_t$.

Once all collision-free candidate transforms are obtained, they may be scored by a scoring function formulated from a positioning heuristic. For example, the Deepest-Bottom-Left-First heuristic can be formulated as the score:

$$Z + c \cdot (X+Y) \quad (9)$$

where c is a small constant.

The candidates may then be ranked by score with lower indicating a better score. If only robot-packable constraints are required, the placement candidate with the lowest score may be returned. If additional constraints are specified, the ranked candidates may be checked for the additional constraints until a candidate satisfying all constraints is returned.

After a new object has been placed, the computing system may update the heightmap of the container $H_c$. This subroutine may also be used in the Heightmap-Minimization heuristic. Given a pose X, Y, Z of the object to be packed, and the top heightmap $H_t$ at the given orientation, the computing system may calculate an updated heightmap $H_c'$ adding the placed object as follows:

For all $i = 0, \ldots, w-1, j = 0, \ldots, h-1$, let:

$$H_c'[x+i, y+j] = \max(H_t[i, j] + Z, H_c[x+i, y+j]) \quad (10)$$

if $H_t[i, j] \neq 0$, and otherwise $$H_c'[x+i, y+j] = H_c[x+i, y+j]. \quad (11)$$

A packing attempt for a single item may be summarized in Algorithm 3, and an overall pipeline for packing multiple objects may be given in Algorithm 4. Given a heuristic packing sequence, Algorithm 4 calls Algorithm 3 for each item with the set of planar-stable rolls and pitches, and previously discussed. This first stage may find placements for most objects in typical cases. For the remaining unpacked items U, the algorithm may activate the fallback procedure. The fallback procedure may examine each unpacked item and attempt to perturb the planar stable orientations by iterating over rolls and pitches until a solution is found, and if no solution is found the algorithm may terminate with failure.

| | Algorithm 3: packOneItem |
|---|---|
| | input : item geometry G, container C, pitches and yaws O, sequence of the packed items $\{s_1, \ldots, s_i\}$ $\{P_1, \ldots, P_i\}$ |
| | output: Transform T or None |
| 1 | $\mathbf{T} \leftarrow$ 3DGridSearch(G, C, O); |
| 2 | Score each T in $\mathbf{T}$ based on heuristic used: |
| 3 | for up to N lowest values of T in $\mathbf{T}$ do |
| 4 |    if $\neg$ isStable(T · G, C, $P_1 \cdot GS_1, \ldots, P_i \cdot GSi$) then continue: |
| 5 |    Compute grasp poses $T_1^G, \ldots T_n^G$ compatible with T; |
| 6 |    if isManipFeasible(T · G, $\{T_1^G, \ldots T_n^G\}$) then return T; |
| 7 | end |
| 8 | return None |

```
Algorithm 4: Robot feasible packing with fall back procedures input : Item geometries G₁, . . . , G_N, container C,
               initial packing sequence {s0₁, . . . , s0_N}
       output: Transforms T and sequence S, or None
 1     Initialize T, S, U, O to empty lists;
 2     for  Gi ∈ {G₁, . . . , G_N} do
 3     |    Get planar-stable rolls and pitches for Gi with the
       |    top n highest quasi-static probabilities
       |    Oi = {(ϕ₁, ψ₁), . . . , (ϕ_n, ψ_n)};
 4     |    Add Oi to O;
 5     end
 6     for  s0i ∈ {s0₁, . . . , s0_N} do
 7     |    T = packOneItem(Gs₀i, C, Os₀i, S, τ);
 8     |    if T then Add T to T, Add s0i to S;
 9     |    else Add s0i to U;
10     end
11     for  ui ∈ U do
12     |    Let {(ϕ₁, ψ₁), . . . , (ϕ_n, ψ_n)} be the planar-stable
       |    orientations in Oui;
13     |    for t_r ∈ {0, Δr, 2Δr, . . . , 2π − Δr} do
14     |    |    for t_P ∈ {0, Δr, 2Δr, . . . , 2π − Δr} do
15     |    |    |    Ot =
       |    |    |    {(ϕ₁ + t_r, ψ₁ + t_P), . . . , (ϕ_n + t_r, ψ_n + t_P)};
16     |    |    |    T = packOneItem(Gui, C, Ot, S, τ);
17     |    |    |    if T then
18     |    |    |    |    Add T to τ; Add ui to S;
19     |    |    |    |    continue with Line 11
20     |    |    end
21     |    end
22     |    return None
23     end
24     return (τ, S)
```

In an example embodiment, the Heightmap-Minimization heuristic may be used to utilize space in a 3D container. Specifically, the heuristic may favor item placements that result in the smallest occupied volume in the container, as observed from the loading direction.

The Heightmap-Minimization heuristic may score an object placement as follows. Given the candidate transform T=(roll, pitch, yaw, X, Y, Z), a computing system may determine a tentative container heightmap $H'_c$ using the update routine in equation 12. The container may have a shape of (w, h). The score for the placement using the Heightmap-Minimization heuristic is:

$$c \cdot (X + Y) + \sum_{i=0}^{w-1} \sum_{j=0}^{h-1} H'_c[i, j] \tag{12}$$

Where c is a small constant.

The Heightmap-Minimization heuristic may favor positions and orientations that result in good space utilization as it may minimize wasted space a holes that cannot be filled. The Heightmap-Minimization heuristic may also favor stable placements since the bottom of the object to be packed is encouraged to match the shape of the supporting terrain.

Once a packing plan is determined, the method may include loading, by a robotic arm, at least a portion of the plurality of objects into a container according to the packing plan for the plurality of objects 408. The robotic arm may grasp objects to move the objects that were placed in the picking area from the picking area, into the container in the packing area. During grasping, if the robot's force sensor detected that the object was not successfully lifted, the robot may attempt the next computed grasp pose that can achieve the planned object placement with a collision-free loading motion. Moreover, while packing an object into the container, if an immediate contact force exceeding 20N is sensed by the force/torque sensor, the object may be released to avoid crushing objects during "smash" events.

The robotic arm may then place and pack the objects in the container. In an example embodiment, the method may include sensing, by a plurality of object detection sensors, a content placement within the container 410. The content placement may be sensed by a plurality of object detection sensors, including overhead depth sensors and cameras. To reduce the impact or errors while packing an offline plan, the computing system may utilize closed-loop packing and robust planning. In closed-loop planning, the object pile within the container may be monitored and remodeled using the sensors after each placement of an object within the container. Based on the content placement within the container, the method may include determining a deviation from the packing plan 412. A deviation may be detected if the pile shifted significantly from expected, preventing subsequent items from being executed as planned.

The method may further include, based on the deviation from the packing plan, performing at least one of: moving the object thereby correcting the deviation, or adjusting a remainder of the packing plan 414. In the case of a deviation, the packing locations of the remaining objects may be replanned while maintaining consistency in the previous plan where possible. The method may also detect whether an object is lying partially outside of the container, and perform a push maneuver to attempt to push the object back in.

In an example embodiment, determining a deviation from the packing plan may include comparing a height map of the actual content placement within the container to a height map of the packing plan. In an additional embodiment, with the overhead depth sensor, a pre-placement depth map of the container may be captured and continuously compared with the depth after each object is placed in the container, a post-placement heightmap. If the incoming object's three-dimensional model at its planned packing location is in collision with the pre-placement heightmap, the number of colliding pixels is determined. A "significant deviation" is triggered when the number of colliding pixels exceeds a threshold of 20% of pixels belonging to the incoming object.

If no significant deviation is determined, the item may be placed in the planned transform as usual, which helps maintain coherence with the existing plan. If a significant deviation is detected, the strategy may replan a new optimal placement for the infeasible object given the pre-placement heightmap. Rather than trying to identify the pose of each object in the pile, which is prone to significant errors, the heightmap may be treated as the geometry of an object rigidly-fixed to the container. The use of the sensed heightmap during packing as a collision geometry suffices for collision checking between the robot and gripper, and stability checking verifies whether there is sufficient friction between a rigid pile and subsequent placed objects.

To perform the push maneuver to push a misplaced object into the container, the method may include capturing a post-placement heightmap, and detecting whether an object's horizontal extent surpasses the dimensions of the container. If so, the robot's gripper may push in a straight line perpendicularly to the box wall, with the end effector's lowest portion slightly above the box's maximum height. This movement is aimed at the geometry center of the portion of the object outside the container dimensions.

The method may also include robust planning to reduce errors. Robust planning predicts the future effects of uncertainty so that unexpected behaviors are less likely to occur. In order to avoid possible errors, robust planning avoids tight fits with a threshold distance of δ. Placements closer than δ to the container wall and/or placed objects may be penalized in the offline planner.

A candidate placement is scored as follows:

$$c \cdot (X+Y) + \sum_{i=0}^{w-1}\sum_{j=0}^{h-1} H'[i,j]$$

Where X and Y are the translation of the object inside the container at a given orientation. H' is the sum of the container heightmap assuming the object is placed at the candidate placement. The heightmap is a two-dimensional image of width w and height h, and c is a small constant. For robust planning, an extra term is added to the scoring function to penalize tight fit:

$$c \cdot (X+Y) + \sum_{i=0}^{w-1}\sum_{j=0}^{h-1} H'[i,j] + C/\max(d_{min}, \delta)$$

Where $d_{min}$ is the minimum horizontal distance between the item and the pile or the container wall. This is computed from the heightmaps of the pile and the item being placed. To compute the minimum distance, only pixels in the pile/container heightmap whose pixel height is larger than object placement height Z and x-y location within and near the object two-dimensional projection onto the x-y plane are considered. The minimum of all horizontal distances between object pixels and the pile/container pixels is taken as $d_{min}$. The value C is taken to be a large constant such that $C/\delta$ dominates the other two terms in the sum. In an example embodiment, the method for packing may include utilizing both closed-loop packing and robust planning in an attempt to maximize success.

Determining the packing plan may further include determining a smallest container for packing the objects into from a discrete set of containers for the plurality of objects. The container set may be discrete, such as a set of available boxes, but could also be continuous, such as a varying height. In an example embodiment, an initial portion of the packing plan may include initially packing at least one challenging object, and wherein a subsequent portion of the packing plan includes subsequently re-planning the packing plan. Challenging objects may pose a variety of obstacles to overcome. For example, challenging objects may be the largest items that need to be packed. The size of the objects may be determined using the depth sensor. By determining the depth, the volume can be calculated to determine the largest items. Alternatively, objects that are invisible or partially invisible to depth cameras, such as black or transparent objects. Additionally or alternatively a challenging object may be an object that has a low certainty three-dimensional model. The packing plan may pack the challenging objects first and re-plan the remainder of the packing plan with the remainder of objects that are not challenging as objects that are not challenging can be more easily manipulated to accommodate the challenging object.

In an example embodiment, the packing plan may include adding a dimensional margin to the three dimensional model for each object as previously mention by the use of δ. The packing plan may also include determining a packing sequence for the plurality of objects and a packing pose for each object in the plurality of objects, generating a robotic arm grasp location for each object in the plurality of objects, and generating a robot load trajectory for each object in the plurality of objects to place objects into the packing pose.

The packing sequence may be the order of object placement in the container and the packing pose may be the orientation of the object when placed in the container. In an example embodiment, determining the packing pose for each object in the plurality of objects may include determining that the packing pose of each object is stable against a placed object. The packing pose may be chosen in an attempt to reduce objects that are stacked in the container from toppling and deviating from the packing plan.

For grasp planning, an example embodiment may use a point cloud-based planner that generates a set of vacuum grasp candidates, ensuring that the grasp location is nearly flat, the suction direction is nearly normal to the surface, and the center of mass is almost underneath the grasp point. For example, the grasp point may lie within a radius r=2 cm in the horizontal plane to the centroid of the observed point cloud segment. The areas under the gripper may be planar areas (80% of the surface points directly below the tool are within 0.3 mm to the estimated plane), which helps the vacuum opening to grasp normal to the surface. For use in the packing planner, the set of grasp candidates may be tested one by one for manipulation feasibility, i.e., with the chosen grasp pose, the robot can transfer $G_i$ from $P_0$ to $P_i$ without collision and with successful inverse kinematics solutions being found along the trajectory. Moreover, in the packing pose, the resulting gripper axis may be within a tilting angle $\theta = \tau/4$ to the Z-axis to prevent excessive torques being applied at the gripper. The grasp location for each object assists in having a collision-free load trajectory. The robot load trajectory is a parameter for the robotic arm to place an object into the container without colliding with the container and/or objects already within the container. Additionally, in an example embodiment, sensing by a plurality of object detection sensors may include determining whether objects collided during loading. Determining whether objects collided during loading may assist in re-planning the packing plan and in determining new robot load trajectories.

V. Experimental Results

The parameters used for testing the system and method described above are heuristic constant c=1; heightmap resolution 0.002 meters (m); step size in both X and Y 0.01 m; $\Delta r = \pi/4$ in range $[0, \tau)$; friction coefficient $\mu = 0.7$. Contact points may be obtained using the exact geometry with a scale factor of 1.03. The top 4 planar-stable rolls and pitches with the highest quasi-static probabilities may be used, and candidate number N=100. The computation times may be measured on a single thread. In addition, a systematical evaluation may be performed on the proposed packing system that studies the sources of error and model its magnitude. Further experiments can be conducted to quantify the impact of such errors on the overall packing success rate in Monte Carlo Simulation and on the physical testbed.

For simulation testing, objects were drawn at random from a set of 94 real-world object meshes. On average each mesh contains 10,243 vertices. For testing on the system, 15 real-world items may be selected that are mostly rigid, opaque, graspable, visible to the depth camera, and in a wide range of shapes and weights.

In the experiment, the performance of the method and system were compared with others through simulations. When grasping the object, graspability constraints may require the gripper to grasp within a radius r=2 cm in the horizontal plane to the object's center of mass when the object is sitting in flat orientations. The areas under the gripper should be solid planar areas (80% of the surface points directly below the tool are within 0.3 cm to the estimated plane) for the gripper to grasp normal to the surface, if the gripper is a vacuum. Further, the resulting gripper axis should be within a tilting angle $\Theta=\tau/4$ to the Z-axis.

Stress tests were performed on item sets of size 10. A tall container of size 32×32×30 cm was chosen. 1000 item sets of size 10 were generated and verified with all tested methods to have a non-overlap packing within the chosen container. Since the tilted gripper is likely to collide with the tall container chosen, it is assumed that the gripper can grasp objects of any orientation at the center of objects' top surface, with the gripper axis vertically aligned to the Z axis. In testing, the Heightmap-Minimization heuristic was compared against DBLF and MTA heuristics, as well as an implementation of a guided local search (GLS) method. GLS was run with 5 random restarts, and each restart was terminated after 300 seconds if a solution could not be obtained. Table I reports the percentage of solutions found and the average computation time when comparing planning techniques on 10-item order with and without robot-packable constraints.

TABLE I

|  | HM | DBLF | MTA | GLS |
|---|---|---|---|---|
| Success, non-overlapping (%) | 99.9 | 98.4 | 88.9 | 78.9 |
| Time, non-overlapping (s) | 15.7 | 14.2 | 14.1 | 502 |
| Success, all constraints (%) | 97.1 | 96.3 | 86.3 | — |
| Time, all constraints (s) | 34.9 | 50.1 | 95.4 | — |

Empirically, the Heightmap-Minimization heuristic finds more solutions than the other methods in comparison. With robot-packable constraints, the Heightmap-Minimization heuristic finds 99.9% of all feasible solutions, leading the 2nd place DBLF heuristic by 1.5%, while MTA and GLS are not as competitive. After adding all constraints, each technique may drop in success rate by a few percent, but the Heightmap-Minimization heuristic still leads the other methods. The mean running time of the Heightmap-Minimization heuristic is also 30% shorter, indicating that the highest ranked placements are more likely to be stable than the other heuristics.

In addition, only 3.2% (320 out of 10,000) of the items are packed with the fallback procedure, of these, 51% were packed by adjusting the packing sequence of the item, and the other 49% were packed by performing the search in 5D. Indicating the 3D space searched is indeed likely to contain robot-packable solutions. And the prioritized search in 3D space may be more efficient than always searching in 5D. Running the 5D search typically has an average running time of 522 seconds, which is 15 times slower than the 3D search.

The performance of the packing algorithm may also be impacted by the parameters chosen. With finer rotation granularity $\Delta r$ and more candidates to check against robot-packable constraints, the success rate can be further improved at the cost of increased computation time, as shown in Table II. Table II may show the impact of $\Delta r$ and candidate number N on the results of packing.

TABLE II

| Rotation granularity $\Delta r$ | $\pi/4$ | $\pi/4$ | $\pi/8$ |
|---|---|---|---|
| Number of candidates N | 100 | 500 | 500 |
| Success, all constraints (%) | 97.1 | 97.5 | 98.7 |
| Time, all constraints (s) | 34.9 | 70.05 | 89.40 |

To compare feasibility of the plans produced by the algorithm presently presented and other offline planners, the open-loop execution feasibility of packing plans were tested in a bullet physics simulator. In the simulation, the robot may place one item after another using a top-down loading direction, however, if a 20N resisting force has been reached, the item may be dropped by the robot before the desired pose is reached. The robot may place all items 1 cm elevated from their planned transform; therefore there may be an expected 1 cm drop. The algorithm may allow 20 seconds for the items to settle before the next item is placed. The plan is then considered a success if all items are contained within the container when placement is complete. In the 10 item case, 948 out of 971 (≈98%) of robot packable plans obtained using the Heightmap-Minimization heuristic are executed successfully. This is higher than the 83% success rate without robot-packable constraints.

During experimentation, the certainty of the packing was also evaluated. From experimentation, a dataset of all experiment items placed in various poses and positions on the picking area, complete with RGB images, depth images, and point clouds, taken by Realsense and Ensenso cameras in their overhead mounting positions was collected. In example embodiments, the cameras could include Realsense SR300 and Ensenso N35 cameras, among other possibilities. Around 200 poses and positions are taken for each object. 70% of the dataset was used for training, and the remaining 30% of the dataset was withheld for testing.

In the test set, object segmentation was 100% successful because the input objects were placed in isolation. The object recognition pipeline achieved a 98.5% top-1 accuracy on the testing set, which indicates that for 7.2% of 5-item order sets, at least one of the objects may be misidentified. Note that because all objects in the packing area need to be packed, a misidentified object may not necessarily lead to failed packing. Instead, it could contribute to a geometry modeling error. To obtain the pose estimation error, the 6D pose estimation result from the packing pipeline may be further corrected by manual alignment of the projected and ground truth (using Meshlab software for example). Grasp acquisition errors were not observed in the testing setup (so $\varepsilon_{lift} \approx 0$), in large part because objects were chosen from the YCB dataset that were more easily lifted by suction. In-transit manipulation errors never occurred during the experiments ($\varepsilon_{manip} \approx 0$). Box placement error is also quite low ($\varepsilon_{box} \approx 0$) compared to other sources of error, e.g., calibration, because it is relatively simple to align the box to within a millimeter or two of the calibrated footprint. Moreover, it may be a simple matter to add rigid fixtures to the packing area to constrain the box even further. Since these errors are so low, they were not included in the analysis.

Observe that calibration, pose estimation, and grasp positioning errors all contribute to the pose of the object-in-hand, which leads to an error in where the object is packed. Specifically, this is the final translation and rotation error of an object from a planned packing location $P_i$, assuming no collisions occurred during loading. This may be called summary error placement error $\varepsilon_{place}$, and can be evaluated experimentally. The evaluation may perform 80 single item manipulations by a known transform that transforms objects from one planar orientation to another. Before the manipulation, the point cloud of the object may be captured and the pose of the segment may be estimated. After manipulation, the point cloud of the object may be captured again, and the observation may be manually aligned to the projected object pose. $\varepsilon_{place}$ may be taken to be the RMSE of these alignment errors. Experiments show that placement error is on average 1.02 cm in translation and 0.41 rad in rotation.

A summary of all error sources is given in Table III.

TABLE III

| Error Source | Magnitude |
| --- | --- |
| $\varepsilon_{ID}$ | 1.5% |
| $\varepsilon_{pose}$ | 0.7 cm (translation), 0.3 rad (orientation) |
| $\varepsilon_{geom}$ | Estimate ≈ 0.5 mm |
| $\varepsilon_{place}$ | 1.02 cm (translation), 0.41 rad (orientation) |
| $\varepsilon_{lift}$ | ≈ 0 |
| $\varepsilon_{manip}$ | ≈ 0 |
| $\varepsilon_{box}$ | ≈ 0 |

A more extensive set of experiments were conducted in simulation that introduce different magnitudes of errors and larger test sets through Monte-Carlo Simulation testing. Varying degrees of error from ground truth object poses and depth sensor readings are used as input to each of the packing strategies.

For these tests, the same object sets as in the previous simulation test were used and for consistency the same item sets were used across the range of packing strategies. For picking, objects were rigidly attached to the robot's gripper with a randomly generated pose error, using the same standard deviations as $\varepsilon_{place}$, but scaled with an error scaling factor from 0-200%. The object is dropped when the robot reaches the desired placement pose, or a 20N force threshold is reached.

Figure 5:
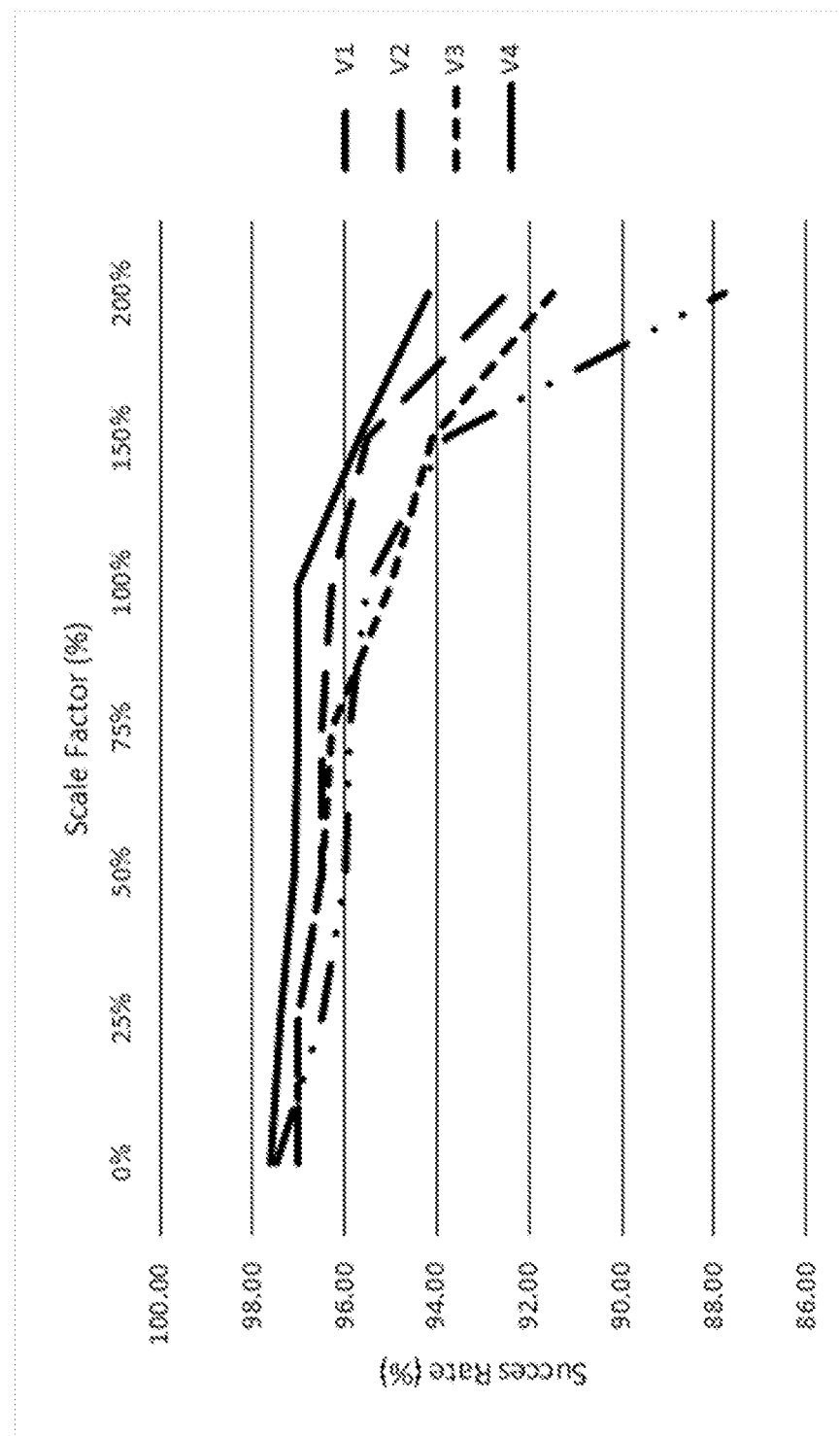
FIG. 5 illustrates packing success rates for different strategies, according to example embodiments.

The packing success rates for strategies V1-V4 are plotted in FIG. 5. V1 is a baseline where plans are generated and executed assuming perfect models, V2 is robust planning in which the packing planner is modified to avoid tight fits, V3 is closed-loop vision in which a sensor re-senses the object pile after each placement and if the heightmap of the pile deviates from the plan then a replan is triggered, and V4 is robust planning and closed-loop planning together. For V2 and V4, a δ value of 1 cm may be used. At 0% error, all experimental variations performed similarly, just under 98% success rate, while closed-loop strategy performs slightly worse. This can be largely attributed to the treatment of the pile as a rigid, infinite-mass object during replanning, which fails to capture the nuances of the pile's stability.

When an error greater than 100% is introduced, the success rate for the baseline strategy drops off sharply as the error increases. Meanwhile, the rate of drop off is noticeably slower for the other 3 comparison strategies that employ robustness measures. The best performer is V4 that uses both robust planning as well as dynamic replanning, achieving the highest or near highest success rate at all positioning errors introduced, and maintain a packing success rate at 94.5% at 2.04 cm translation error and 0.82 rad in rotation error. It should be noted that increasing δ, the margin for each object, may not always lead to better performance under uncertainties.

For testing on the physical platform, 100 sets of 5-item orders were generated from experiment items. The robust planning strategies (V2 and V4) may use δ=1.02 cm. Table IV summarizes the results and also includes V1.5 which is a baseline where plans are generated and executed with dynamic models. Both closed-loop and robust methods (V2 and V3) perform significantly better than the baselines (V1 and V1.5), while the combined method (V4) performs best of all, beating the baseline success rate 100% to 84%. Table IV also shows the volume density of each container after being packed. The table further shows the number of times the maximum loading force (20 N) was exceeded, which indicates approximately how often a smash event was observed and how much damage the object sustained during packing. The same pattern is observed, showing that both closed-loop and robust strategies decrease the rate of smashing. The last row shows how many times a closed-loop push maneuver was performed, showing that these are rather rare, but are still helpful to improve success rates by a few percentage points.

TABLE IV

| | V1 | V1.5 | V2 | V3 | V4 |
| --- | --- | --- | --- | --- | --- |
| Success rate (%) | 84 | 94 | 96 | 96 | 100 |
| Volume density (%) | 36.6 | 38.9 | 38.7 | 37.6 | 38.0 |
| Max Force exceeded (# per order) | 1.36 | 0.81 | 0.60 | 0.54 | 0.53 |
| Push performed (# per order) | — | — | — | .07 | .03 |

Object classification results, pose estimation results, as well as planned and final placement for each experiments were recorded which allows the causes of cascading failures to be examined more closely. In V1, 9 failures occurred with one or more items protruding outside the box footprint, while 7 failed for objects within the container but which exceeded the maximum height. A final case failed when a rigid object tipped over and stood up underneath the gripper, causing the robot to report a "maximum load exceeded" fault. Some failure cases can be traced to one predominant factor. Four failures can be traced back to failed object identification, which could lead to wrong shape estimation of the object to pack. Three cases can be traced back to pose estimation error (e.g., rotation of 90 degrees, etc.). One case can be traced back to object tipping, which can lead to sudden force changes too rapid to be caught by the force control loop. The remaining failure cases may be caused by cascading errors, e.g., slightly misplaced objects caused the object underneath to tip over, resulting in the subsequent objects to be packed exceeding the container height.

In V2, three cases failed when one or more items protruded outside the box footprint, and the other two failed during toppling events, causing items to exceed the max height. Among the failure cases, two can be traced back to misidentified objects, while one can be traced back to pose estimation error.

In V3, all 5 cases failed due to exceeding the max height. All objects protruding outside the box footprint were corrected by pushing maneuvers. Among the failure cases, two can be traced back to misidentified objects, and two can be traced back to significant pose estimation error.

In V4, the two failure cases appear similar—one box toppled and exceeded the max height. One case was caused by a pose estimation error, while in the other, one item was pushed onto another item, and the impact caused it to tip over.

Through this detailed analysis, it shows that the baseline is more susceptible to failed classifications and pose estimation errors. In V2-V4, the vision pipeline remains the same, but the measures taken against uncertainties may be able to correct for errors in computer vision so that their impact is less pronounced.

Additionally, the experiment was conducted with packing using dynamically acquired models on the same experiment set. A similar trend of performance increase from the baseline to using error mitigation methods were observed. As a matter of fact, with the dynamically acquired model, 100% packing success was achieved in V4.

VI. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system for packing objects into a container comprising:
 a robotic device comprising:
  a robotic arm;
  a plurality of object detection sensors; and
  a controller comprising at least one processor and a non-transitory computer-readable medium wherein the non-transitory computer-readable medium stores a set of program instructions, wherein the at least one processor executes the program instructions so as to carry out operations, the operations comprising:
   sensing a measurement of each object among a plurality of objects with at least one object detection sensor of the plurality of object detection sensors;
   determining, using the sensed measurement for each object in the plurality of objects, and based on a trained machine learning model, whether each object among the plurality of objects matches a predetermined three-dimensional model, wherein the predetermined three-dimensional model is retrieved from a database of reference three-dimensional models;
   obtaining a three-dimensional model for each object in the plurality of objects, wherein obtaining the three-dimensional model comprises:
    based on determining a match between a matched object in the plurality of object and the predetermined three-dimensional model, obtaining the predetermined three-dimensional model;
    based on determining no match between a no-match object in the plurality of objects and the predetermined three-dimensional model, obtaining a dynamically generated three-dimensional model by: (i) determining a depth reading for each no-match object assuming that the no-match object is lying flat and fully touching a table top, and (ii) determining at least one hidden side of the no-match object in the plurality of objects using linear interpolation from a top periphery of the no-match object and a bottom periphery of the no-match object:
   determining a packing plan for the plurality of objects based on the three-dimensional model for each object; and loading, by the robotic arm, at least a portion of the plurality of objects into a container according to the packing plan for the plurality of objects.

2. The system of claim 1, further comprising sensing, by the plurality of object detection sensors, a content placement within the container.

3. The system of claim 2, further comprising determining a deviation from the packing plan based on the content placement within the container, and based on the deviation from the packing plan, performing at least one of:
moving the object thereby correcting the deviation; or
adjusting a remainder of the packing plan.

4. The system of claim 1, wherein the robotic arm includes an end effector comprising at least one of: a vacuum gripper, a pneumatic gripper, a hydraulic gripper, a magnetic gripper, and a servo-electric gripper.

5. The system of claim 1, wherein the plurality of object detection sensors comprises at least one vision sensor.

6. The system of claim 5, wherein the robotic device further comprises a frame and wherein the at least one vision sensor is coupled to the frame, and wherein the at least one vision sensor comprises at least one of a depth sensor or a camera.

7. The system of claim 1, wherein the plurality of object detection sensors comprises a force-torque sensor, and wherein the force-torque sensor is mounted to the robotic arm.

8. A method for dynamically generating a three-dimensional model comprising:
scanning a plurality of objects with at least one object detection sensor of a plurality of object detection sensors;
segmenting a point cloud for each object in the plurality of objects;
projecting the point cloud for each object in the plurality of objects onto an image obtained by at least one object detection sensor of the plurality of object detection sensors for each object in the plurality of objects to obtain a region of interest;
based on the region of interest, generating a three-dimensional model for each object in the plurality of objects, wherein generating the three-dimensional model for each object comprises: (i) determining a depth reading for each object in the plurality of objects assuming that each object in the plurality of objects is lying flat and fully touching a table top, and (ii) determining at least one hidden side of each object in the plurality of objects using linear interpolation from a top periphery of each object in the plurality of objects and a bottom periphery of each object in the plurality of objects;
assigning at least one parameter to the three-dimensional model for each object;
storing the three-dimensional model for each object in the plurality of objects to a database of reference three-dimensional models; and
training a machine learning model to identify one or more objects in the plurality of objects based at least in part on the assigned at least one parameter.

9. The method of claim 8, further comprising isolating each object among the plurality of objects, wherein isolating each object in the plurality of objects comprises using a plane segmentation operation and data clustering operation.

10. The method of claim 8, wherein the image obtained by the at least one object detection sensor for each object in the plurality of objects is at least one of: a black and white image, a red green blue image, a cyan magenta yellow black image, a depth image or a heat map.

11. The method of claim 8, further comprising generating a triangular mesh model for each object in the plurality of objects using a triangulation algorithm.

12. A method for packing objects in a container, comprising:
sensing a plurality of objects with at least one object detection sensor of a plurality of object detection sensors;
isolating each object in the plurality of objects;
segmenting a point cloud for each object in the plurality of objects;
projecting the point cloud for each object in the plurality of objects onto an image obtained by an overhead sensor for each object in the plurality of objects to obtain a region of interest;
determining whether a region of interest for each object in the plurality of objects matches a plurality of predetermined three-dimensional models provided by a trained machine learning model, wherein the plurality of predetermined three-dimensional models is retrieved from a database of reference three-dimensional models;
obtaining a three-dimensional model for each object in the plurality of objects, wherein obtaining the three-dimensional model comprises:
based on determining a match between the region of interest for at least one matched object in the plurality of objects and a predetermined three-dimensional model in the plurality of predetermined three-dimensional models, obtaining the predetermined three-dimensional model;
based on determining no match between the region of interest for at least one no-match object in the plurality of objects and the predetermined three-dimensional model in the plurality of predetermined three-dimensional models, obtaining a dynamically generated three-dimensional model by: (i) determining a depth reading for each no-match object assuming that the no-match object is lying flat and fully touching a table top, and (ii) determining at least one hidden side of the no-match object using linear interpolation from a top periphery of the no-match object and a bottom periphery of the no-match object:
determining a packing plan for the plurality of objects based on the three-dimensional model for each object;
loading, by a robotic arm, at least a portion of the plurality of objects into a container according to the packing plan for the plurality of objects;
sensing, by a plurality of object detection sensors, a content placement within the container;
based on the content placement within the container, determining a deviation from the packing plan; and
based on the deviation from the packing plan, performing at least one of: moving the object thereby correcting the deviation, or adjusting a remainder of the packing plan.

13. The method of claim 12, further comprising:
wherein obtaining the predetermined three-dimensional model for the at least one matched object in the plurality of objects further comprises:
selecting the predetermined three-dimensional model for the at least one matched object in the plurality of objects from the plurality of predetermined three-dimensional models.

14. The method of claim 12, wherein determining the packing plan further comprises determining a smallest container from a discrete set of containers for the plurality of objects.

15. The method of claim 12, wherein an initial portion of the packing plan includes initially packing at least one challenging object, and wherein a subsequent portion of the packing plan includes subsequently re-planning the packing plan.

16. The method of claim 12, wherein determining the packing plan for the plurality of objects based on the three-dimensional model for each object comprises:
   adding a dimensional margin to the three-dimensional model for each object;
   determining a packing sequence for the plurality of objects and a packing pose for each object in the plurality of objects;
   generating a robotic arm grasp location for each object in the plurality of objects; and
   generating a robot load trajectory for each object in the plurality of objects to place objects into the packing pose.

17. The method of claim 16, wherein determining the packing pose for each object in the plurality of objects, comprises determining that the packing pose of each object is stable against a placed object.

18. The method of claim 16, wherein sensing by a plurality of object detection sensors comprises determining whether objects collided during loading.

19. The method of claim 12, wherein determining a deviation from the packing plan comprises comparing a height map of an actual content placement within the container to a height map of the packing plan.

\* \* \* \* \*